Sept. 8, 1942.   G. BITZER   2,295,512
WELT BAR HOOKUP APPARATUS
Filed Dec. 30, 1940   20 Sheets-Sheet 1

INVENTOR:
Gottlob Bitzer,
BY
ATTORNEY.

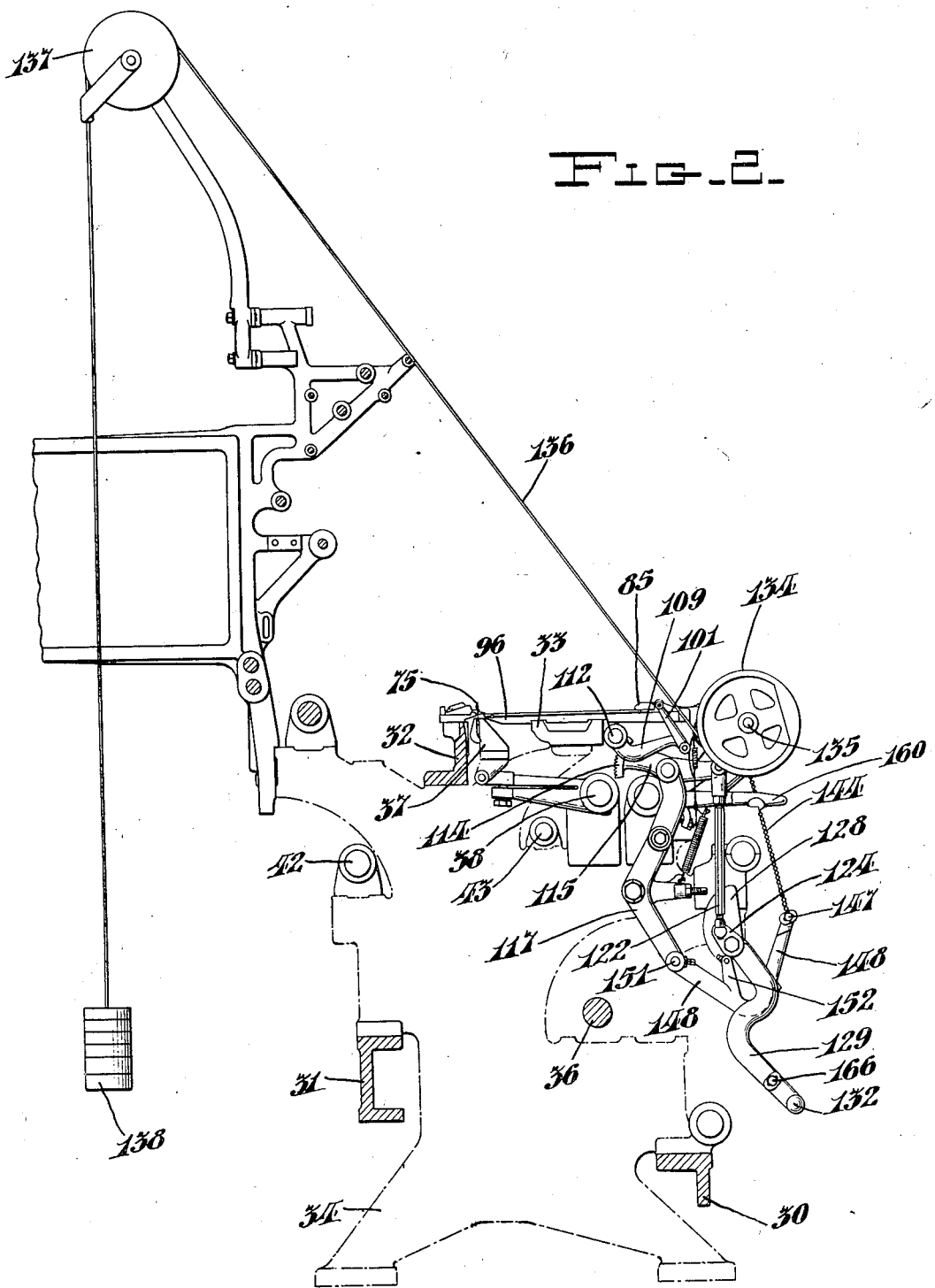

Sept. 8, 1942.　　　　G. BITZER　　　2,295,512
WELT BAR HOOKUP APPARATUS
Filed Dec. 30, 1940　　　20 Sheets-Sheet 3

INVENTOR:
Gottlob Bitzer,
BY
ATTORNEY.

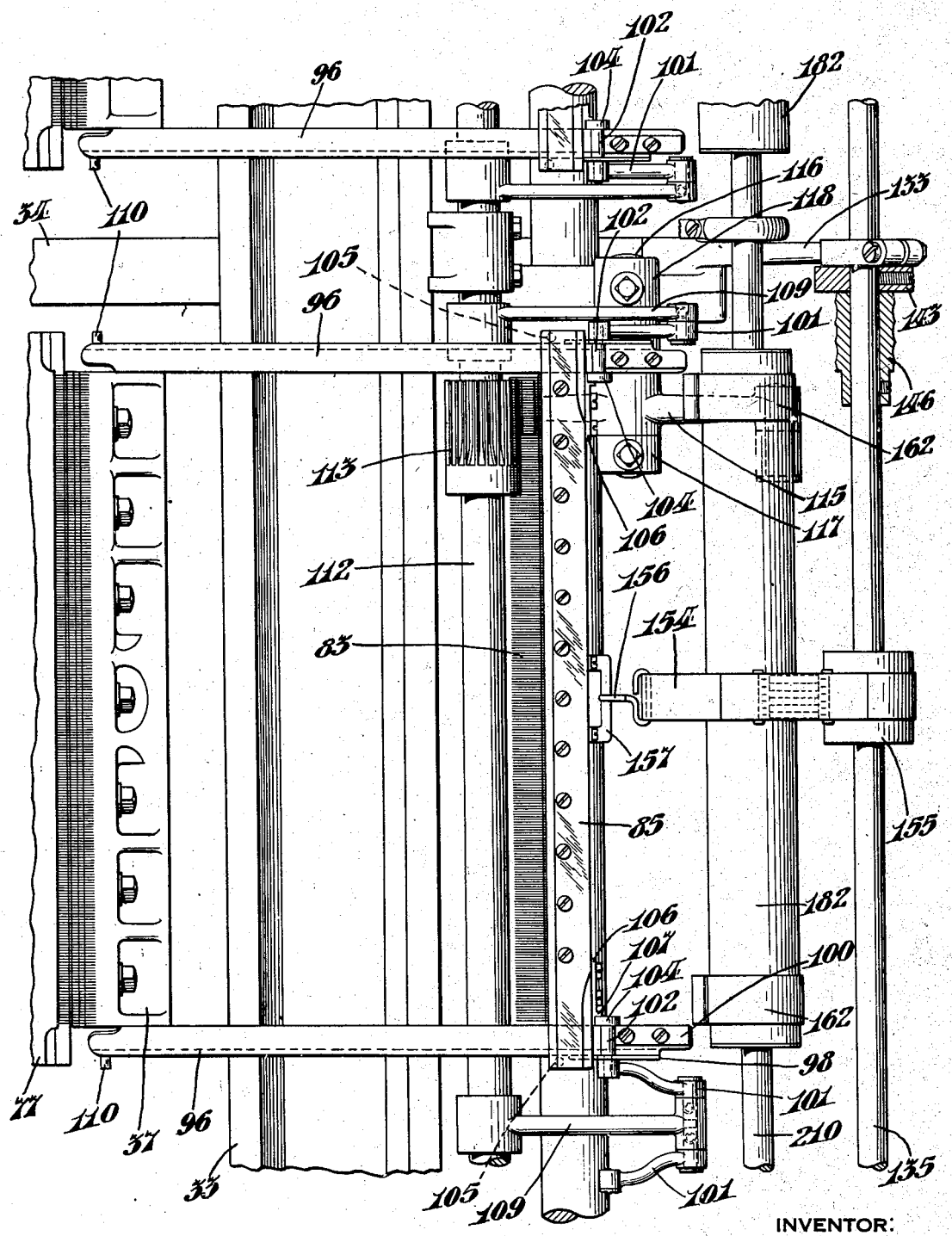

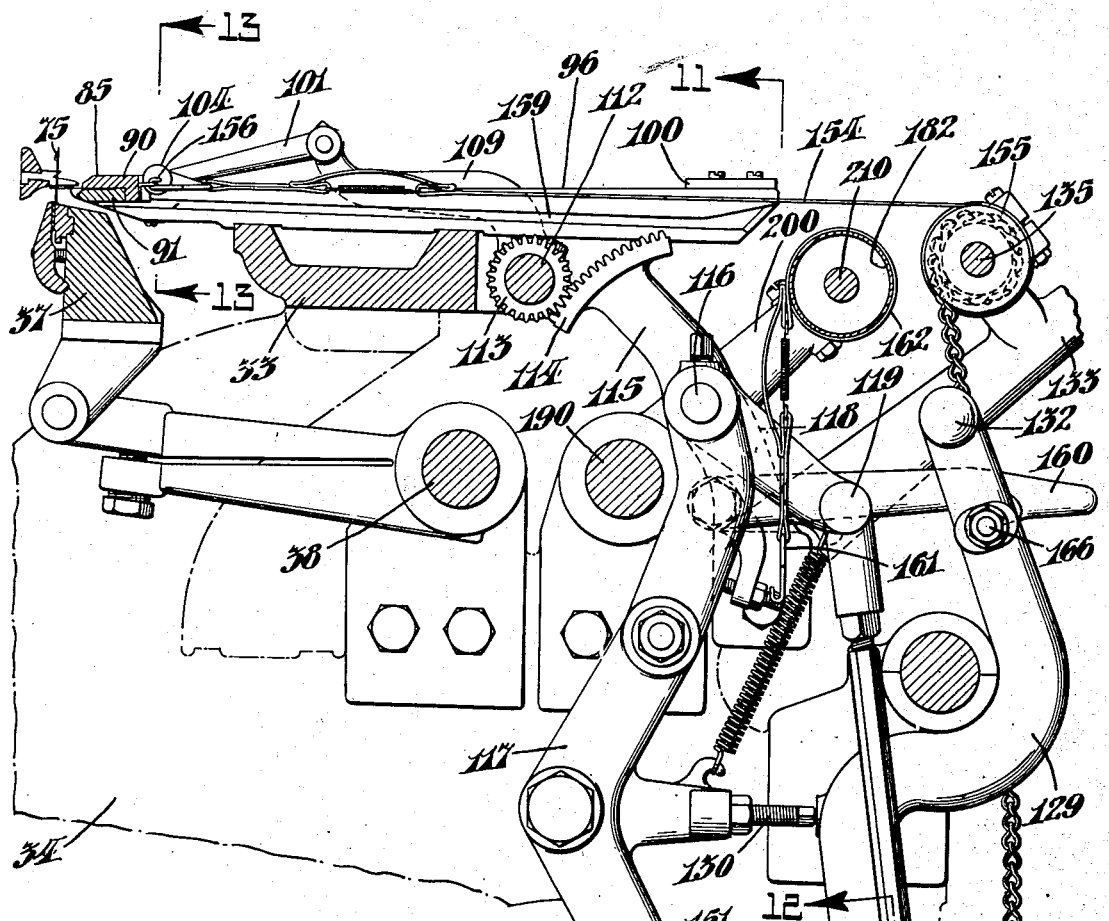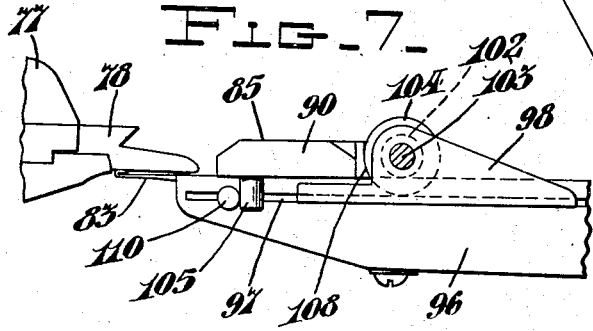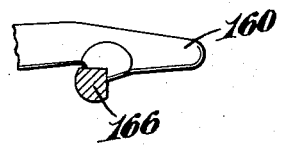

Sept. 8, 1942.   G. BITZER   2,295,512
WELT BAR HOOKUP APPARATUS
Filed Dec. 30, 1940   20 Sheets-Sheet 6
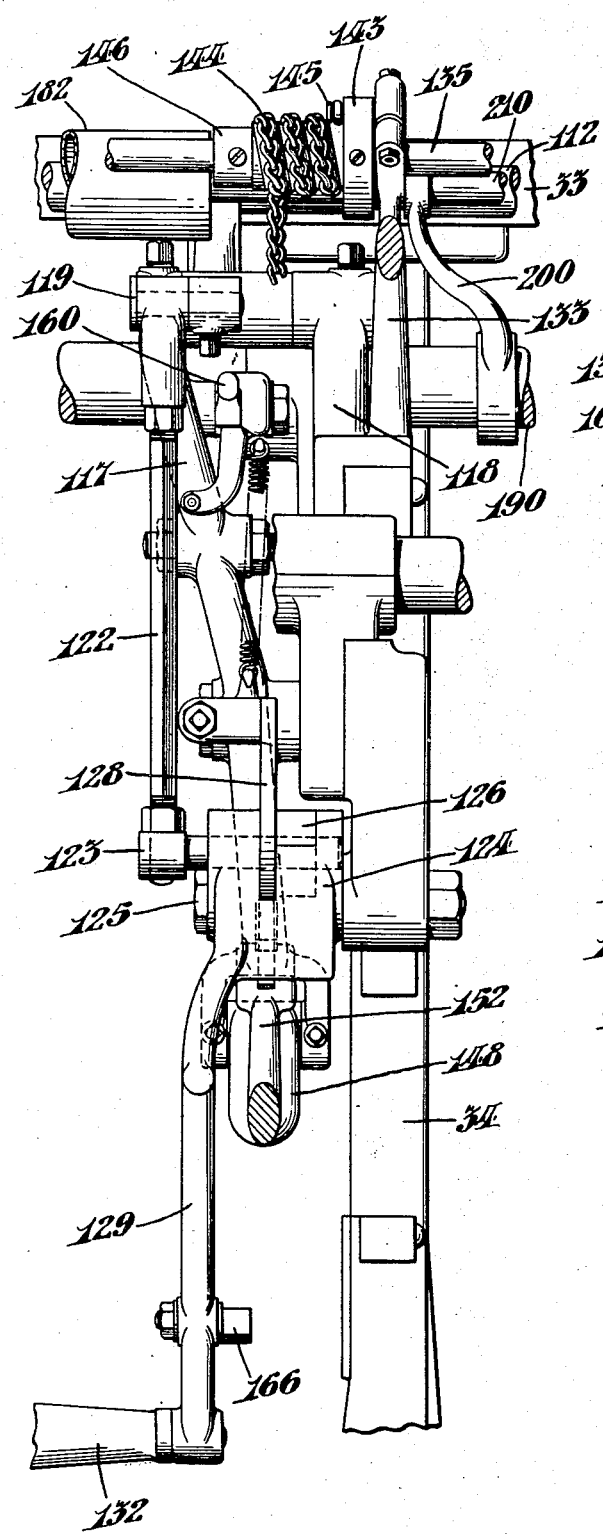
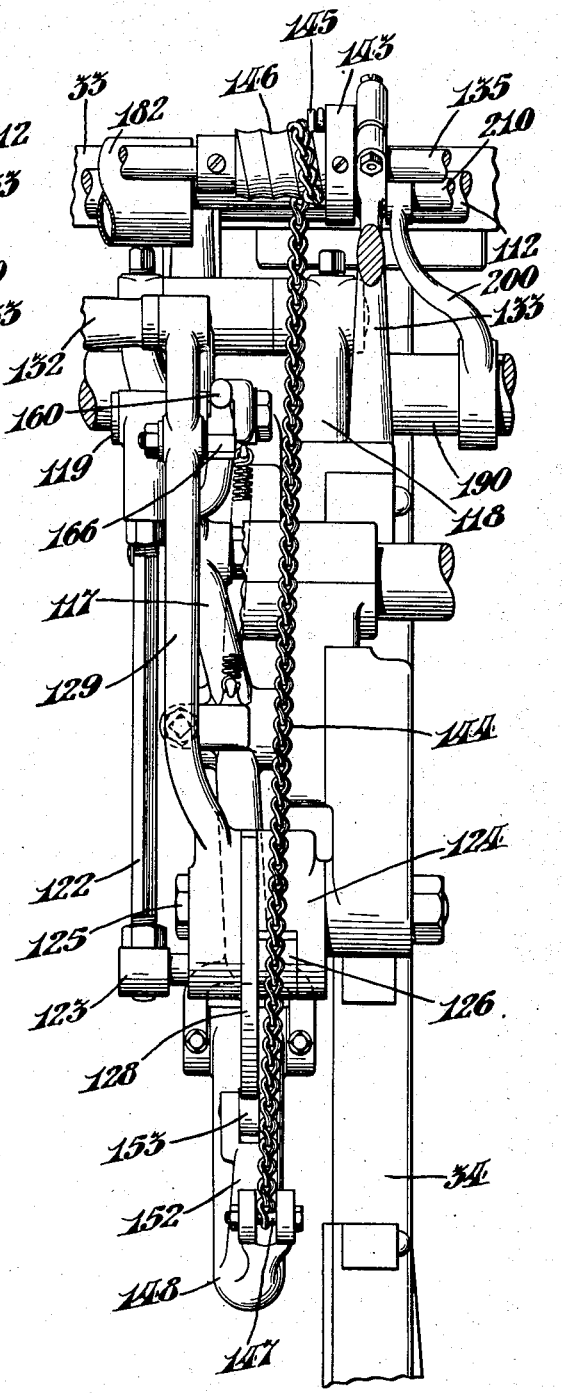
INVENTOR:
Gottlob Bitzer,
BY
Alfred E. Ischinger
ATTORNEY.

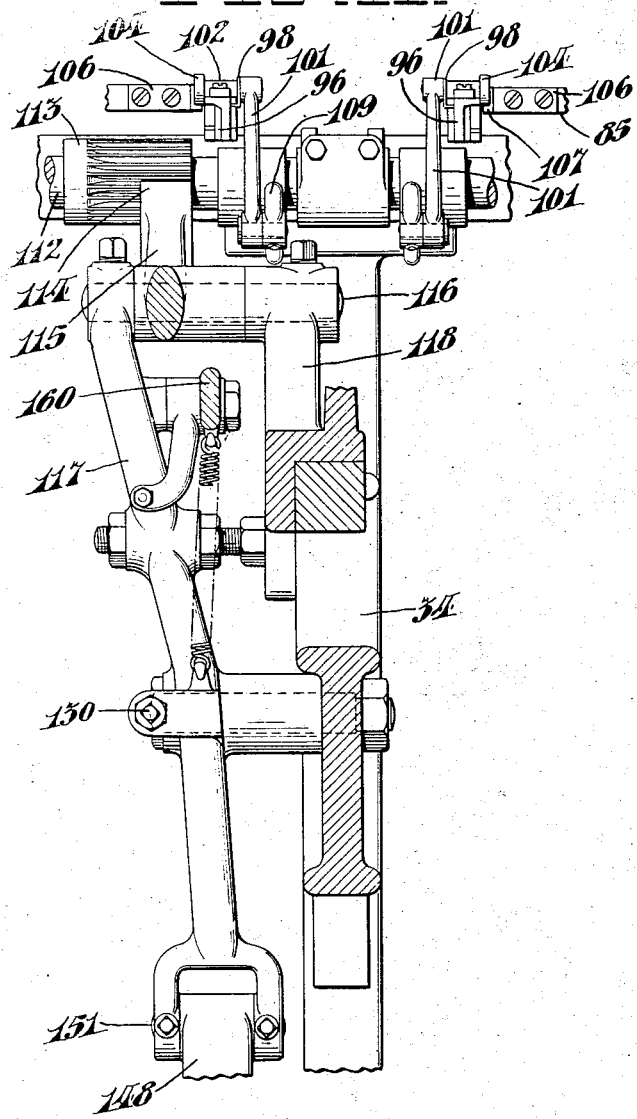

Sept. 8, 1942.    G. BITZER    2,295,512
WELT BAR HOOKUP APPARATUS
Filed Dec. 30, 1940    20 Sheets-Sheet 8

INVENTOR:
Gottlob Bitzer,
BY Alfred E. Dieringer
ATTORNEY.

Sept. 8, 1942.    G. BITZER    2,295,512
WELT BAR HOOKUP APPARATUS
Filed Dec. 30, 1940    20 Sheets-Sheet 9
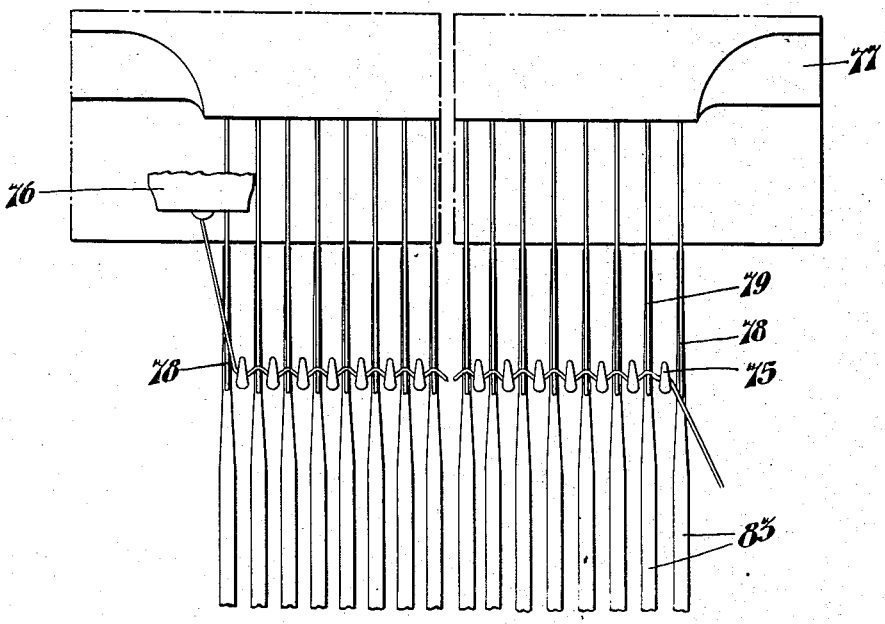
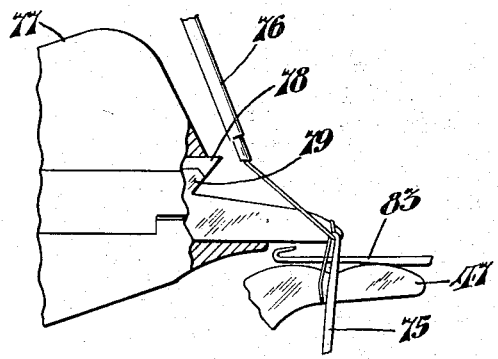
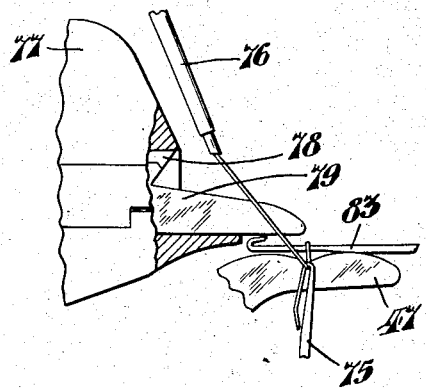
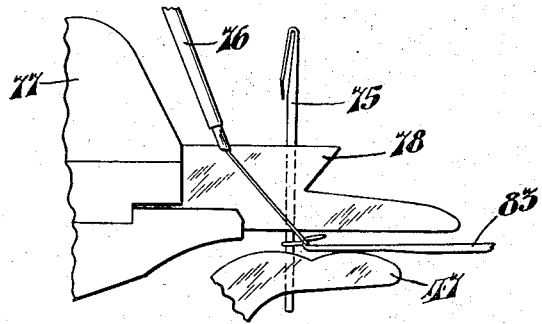
INVENTOR:
Gottlob Bitzer,
BY
ATTORNEY.

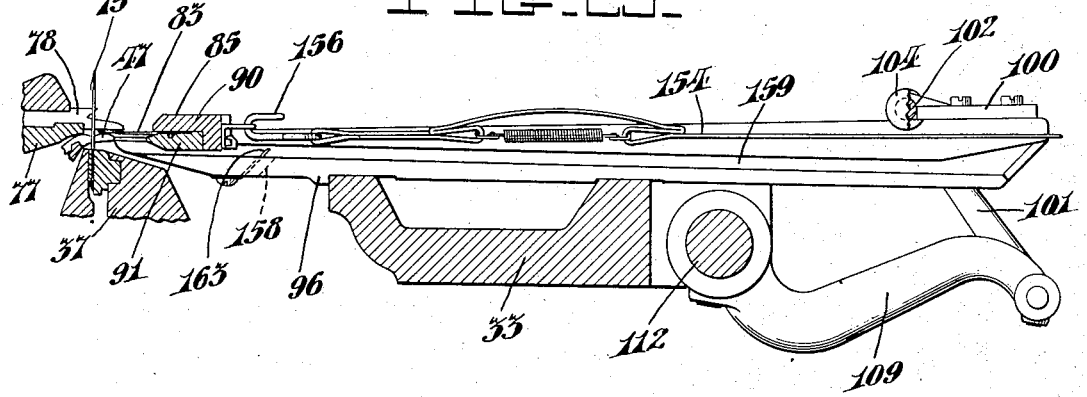
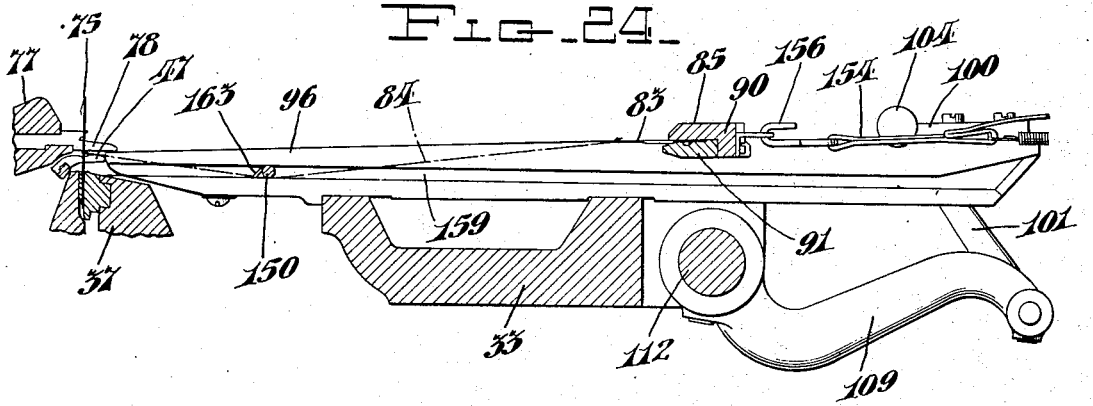
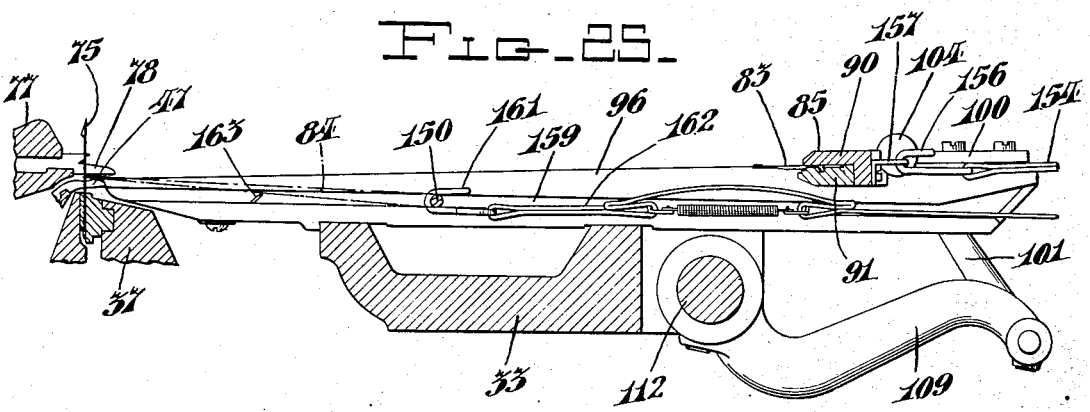

Sept. 8, 1942.                    G. BITZER                    2,295,512
                         WELT BAR HOOKUP APPARATUS
                    Filed Dec. 30, 1940        20 Sheets-Sheet 11

Fig. 26.

INVENTOR:
Gottlob Bitzer,
BY *[signature]*
ATTORNEY.

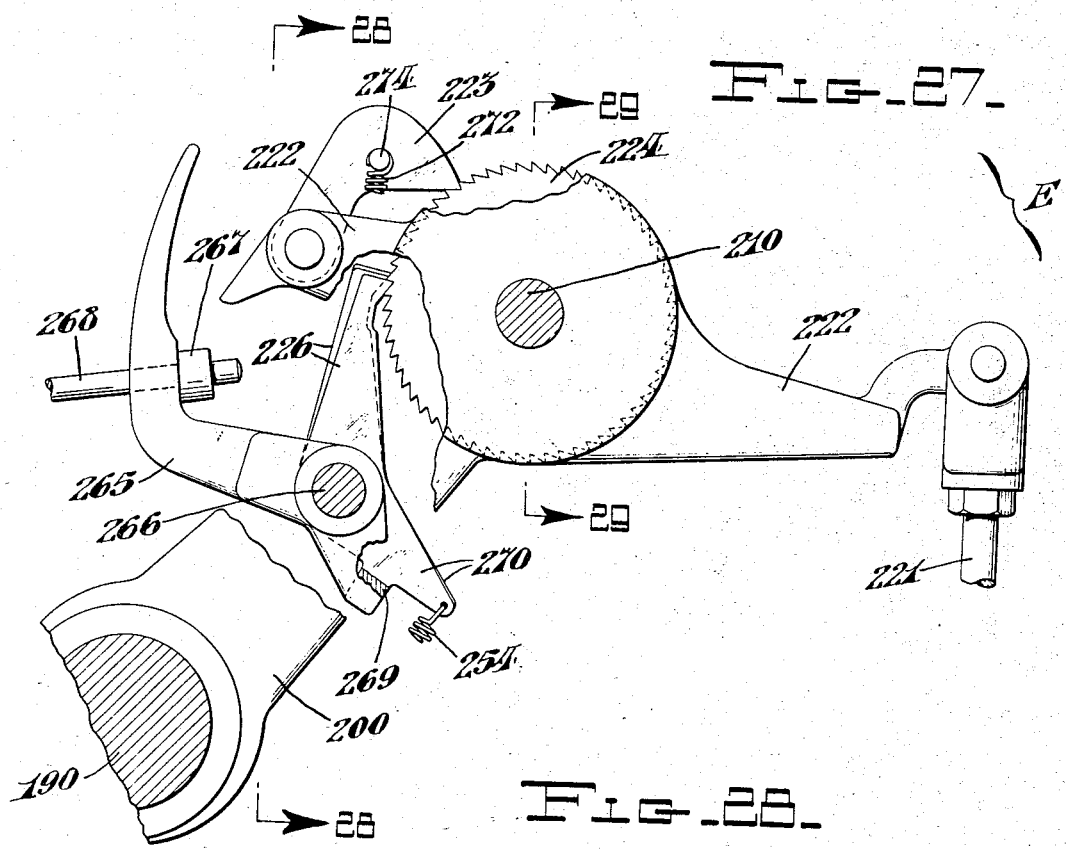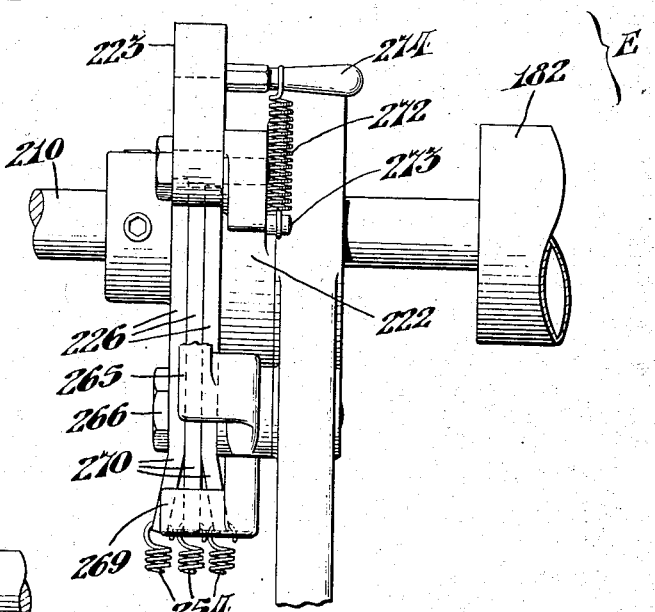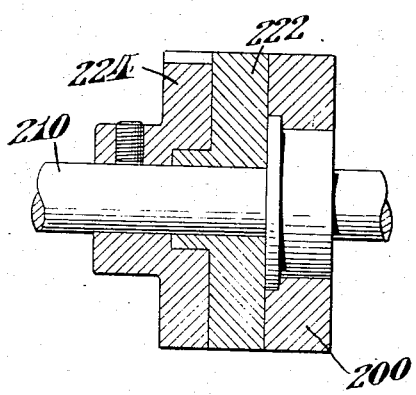

Sept. 8, 1942.   G. BITZER   2,295,512
WELT BAR HOOKUP APPARATUS
Filed Dec. 30, 1940   20 Sheets-Sheet 13
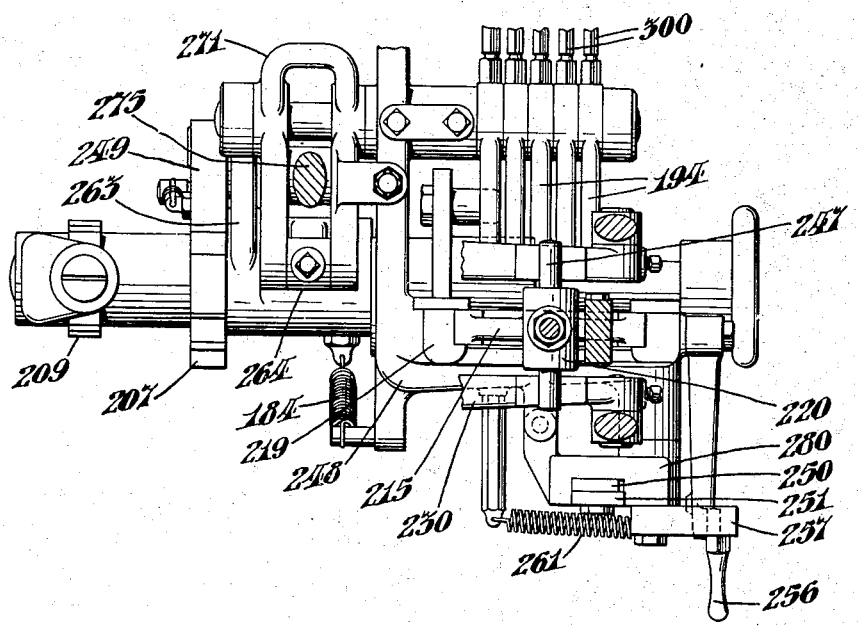
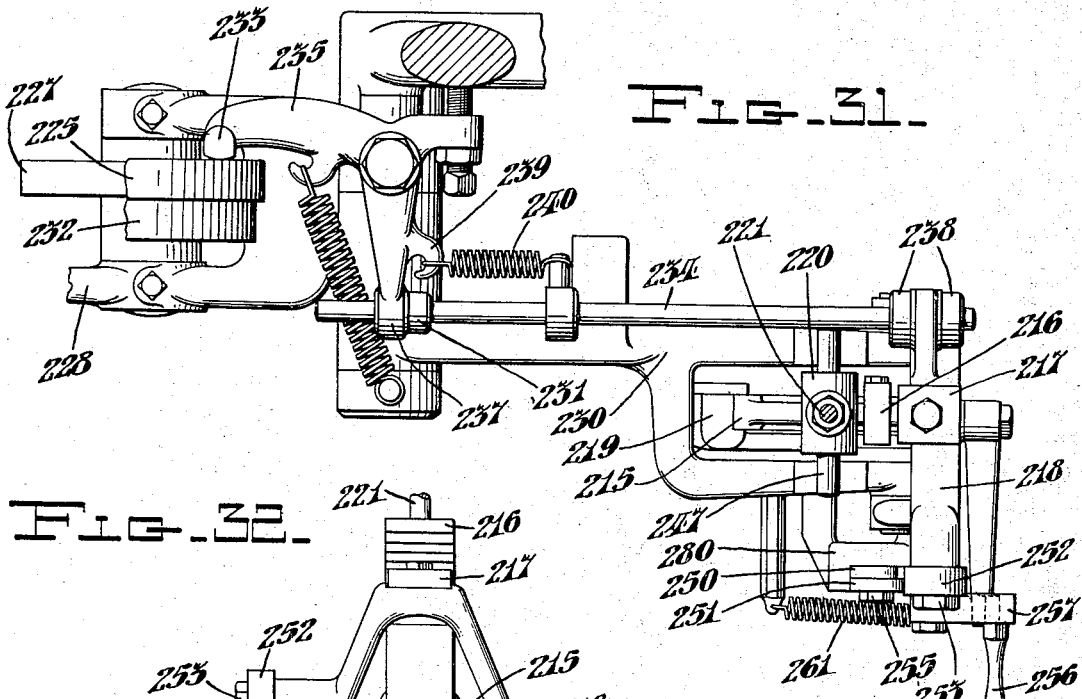
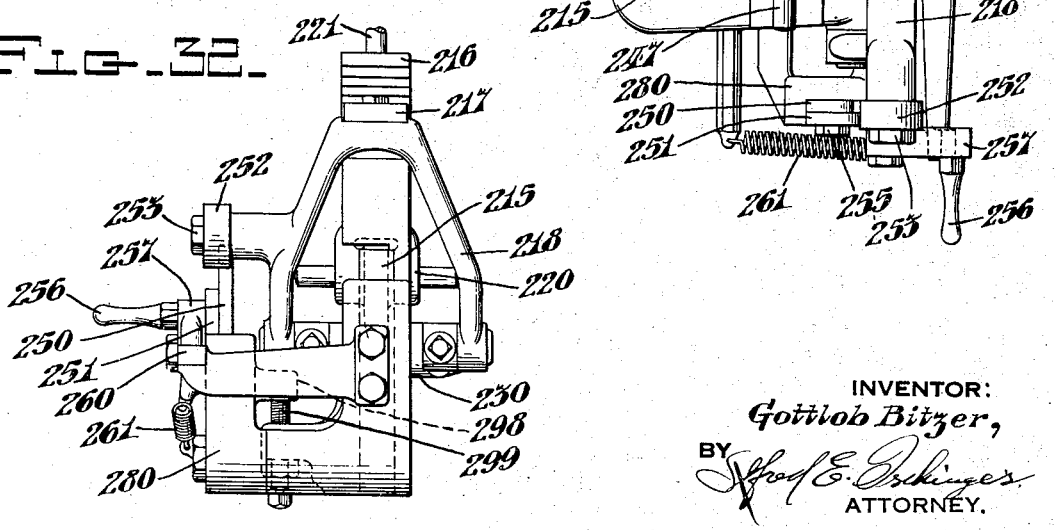
INVENTOR:
Gottlob Bitzer,
BY
ATTORNEY.

Sept. 8, 1942.   G. BITZER   2,295,512
WELT BAR HOOKUP APPARATUS
Filed Dec. 30, 1940   20 Sheets-Sheet 14
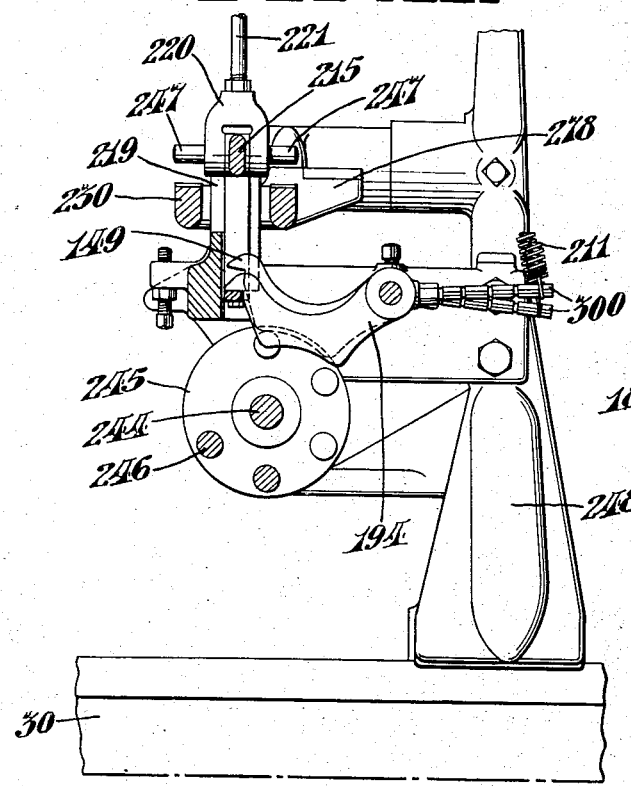
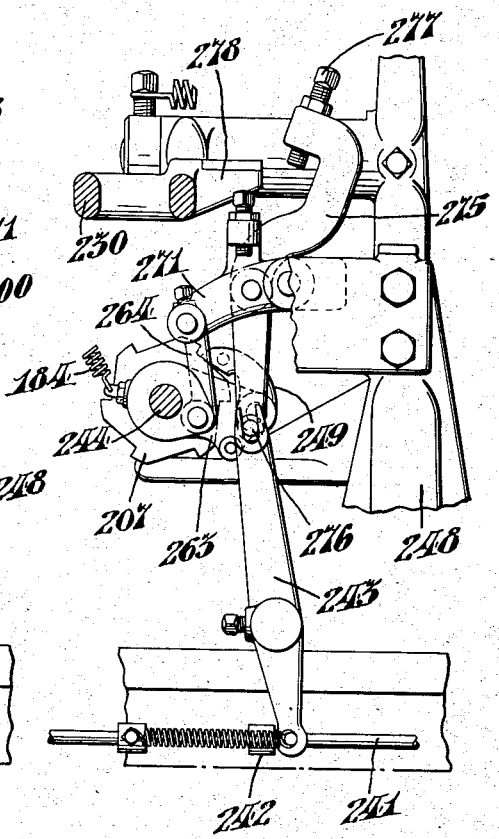
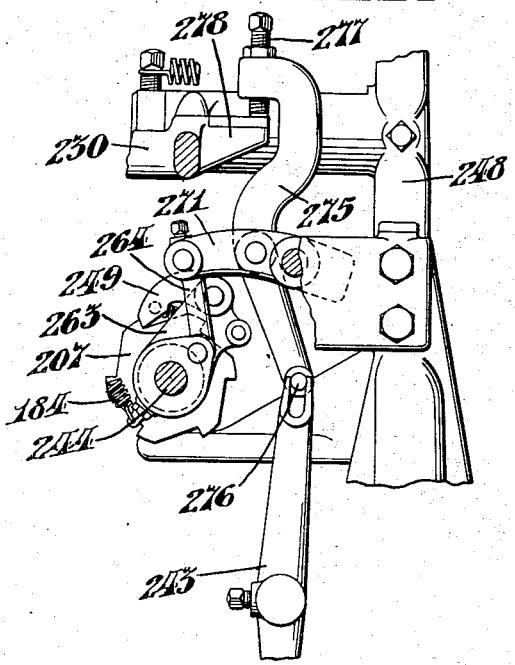
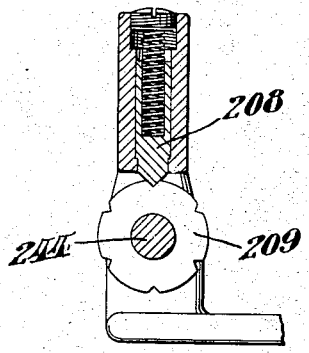
INVENTOR:
*Gottlob Bitzer,*
BY
ATTORNEY.

Sept. 8, 1942.　　　　　G. BITZER　　　　　2,295,512
WELT BAR HOOKUP APPARATUS
Filed Dec. 30, 1940　　　20 Sheets-Sheet 15
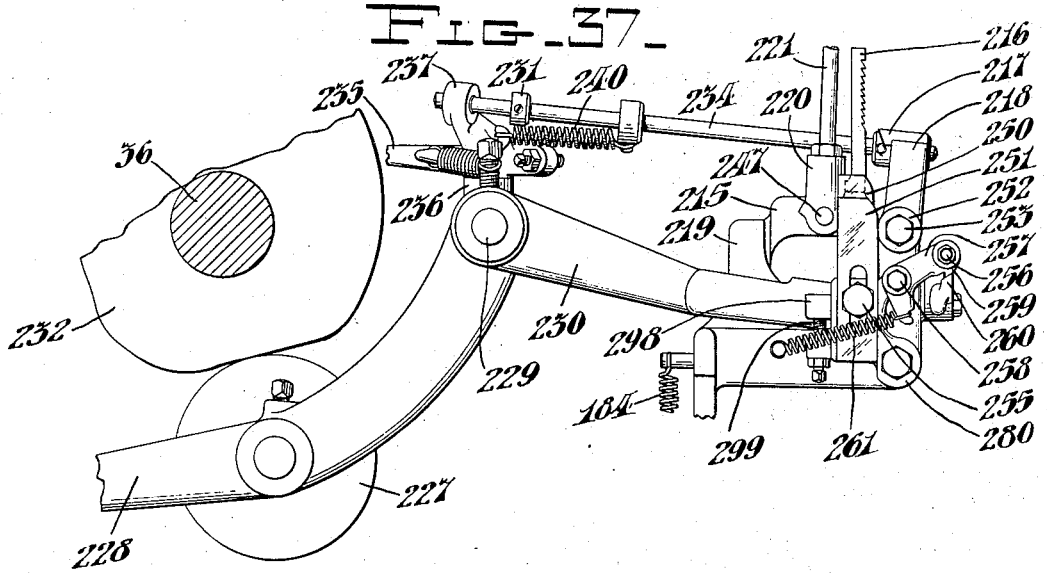
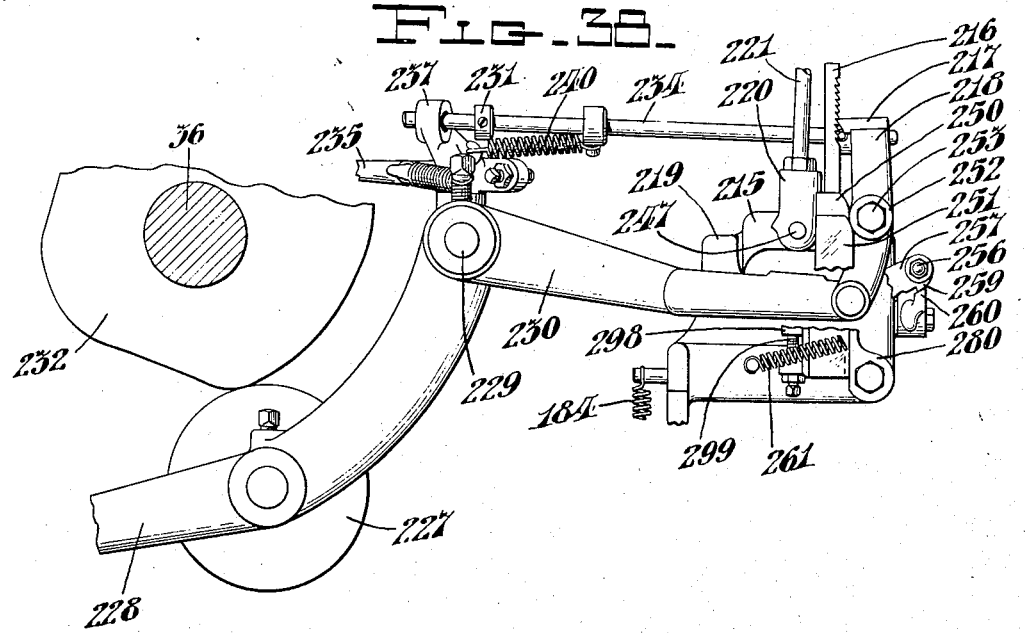
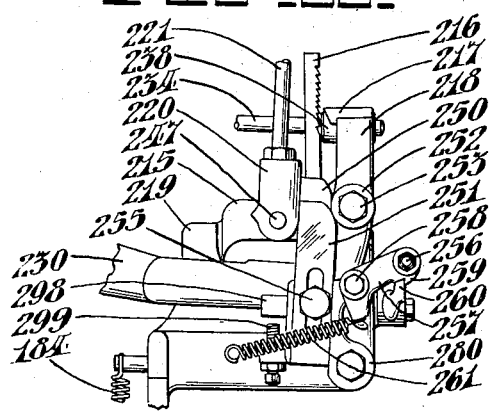
INVENTOR:
Gottlob Bitzer,
BY
ATTORNEY.

Sept. 8, 1942.  G. BITZER  2,295,512
WELT BAR HOOKUP APPARATUS
Filed Dec. 30, 1940  20 Sheets-Sheet 16
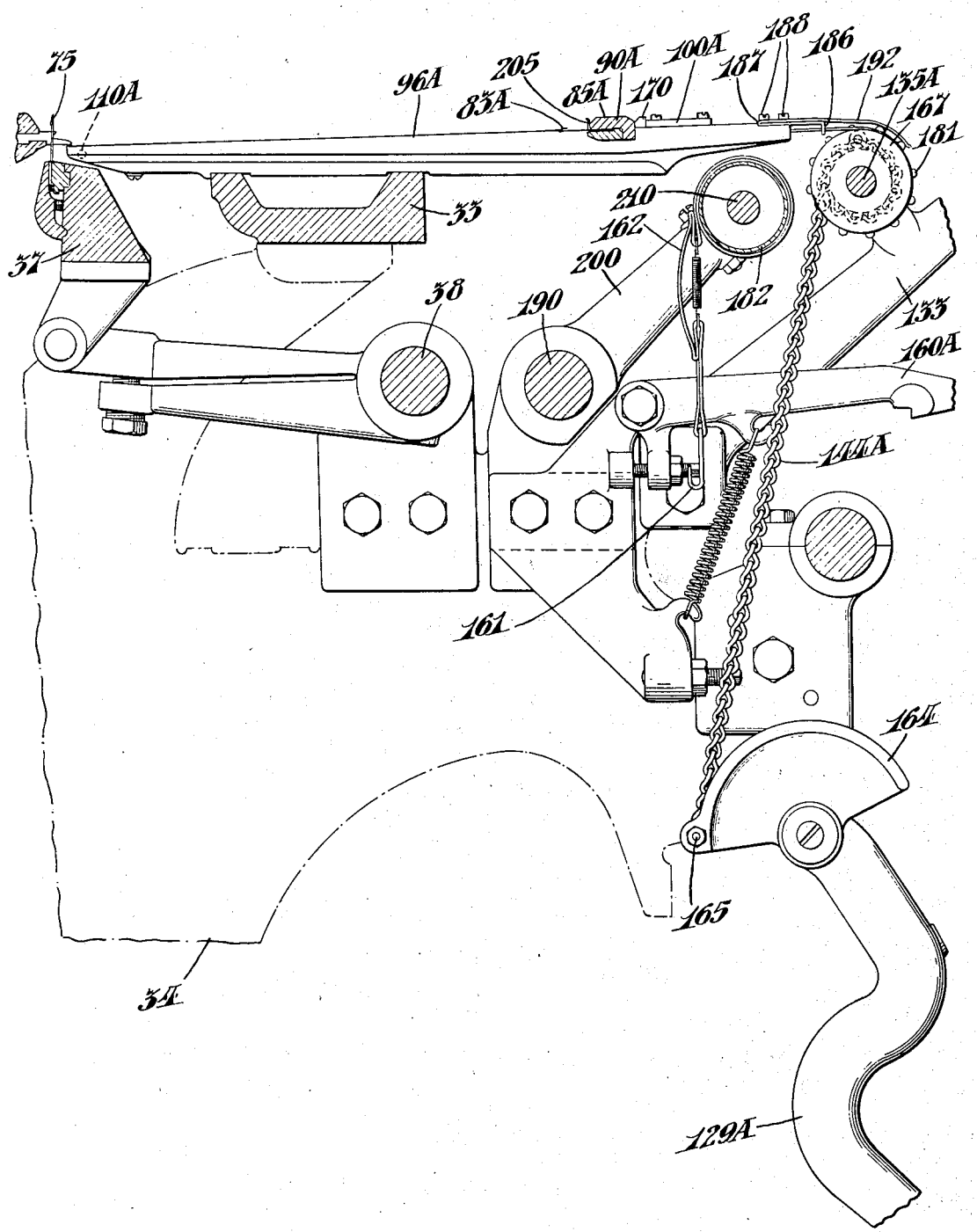

Sept. 8, 1942.  G. BITZER  2,295,512
WELT BAR HOOKUP APPARATUS
Filed Dec. 30, 1940 20 Sheets-Sheet 17

INVENTOR:
Gottlob Bitzer,
BY
Alfred E. Oxinger
ATTORNEY.

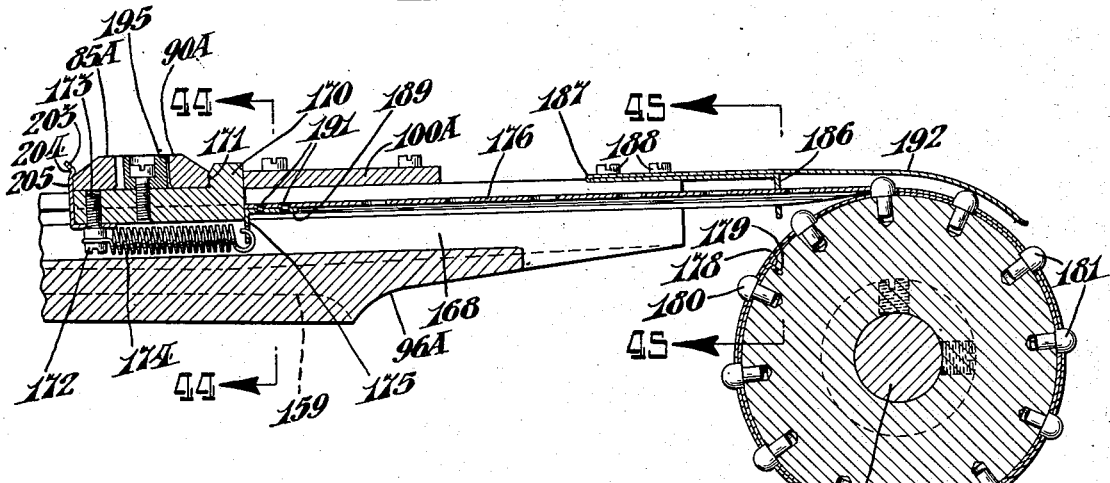
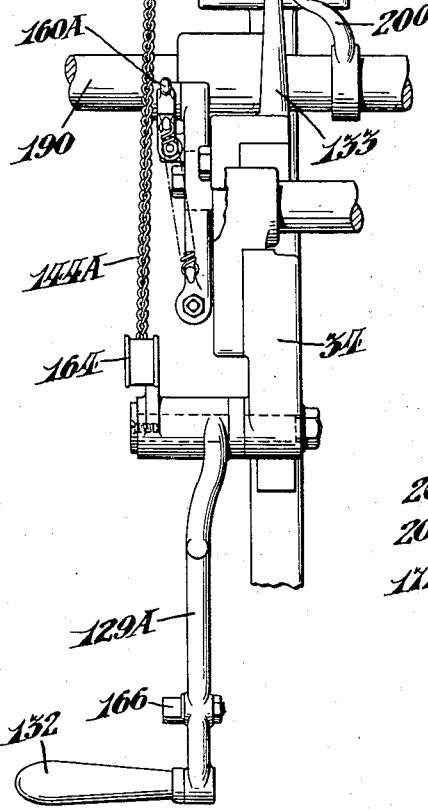
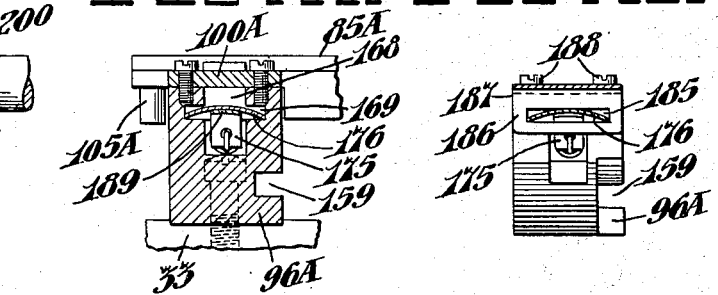
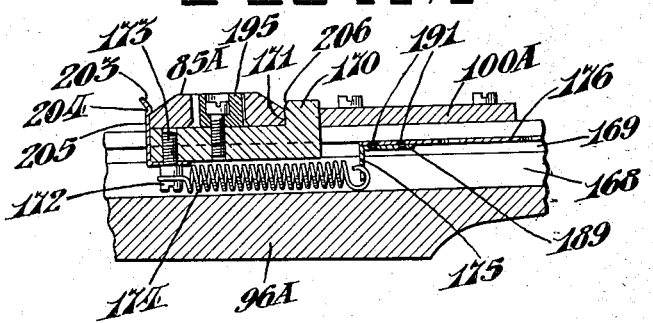

Sept. 8, 1942. G. BITZER 2,295,512
WELT BAR HOOKUP APPARATUS
Filed Dec. 30, 1940 20 Sheets-Sheet 19
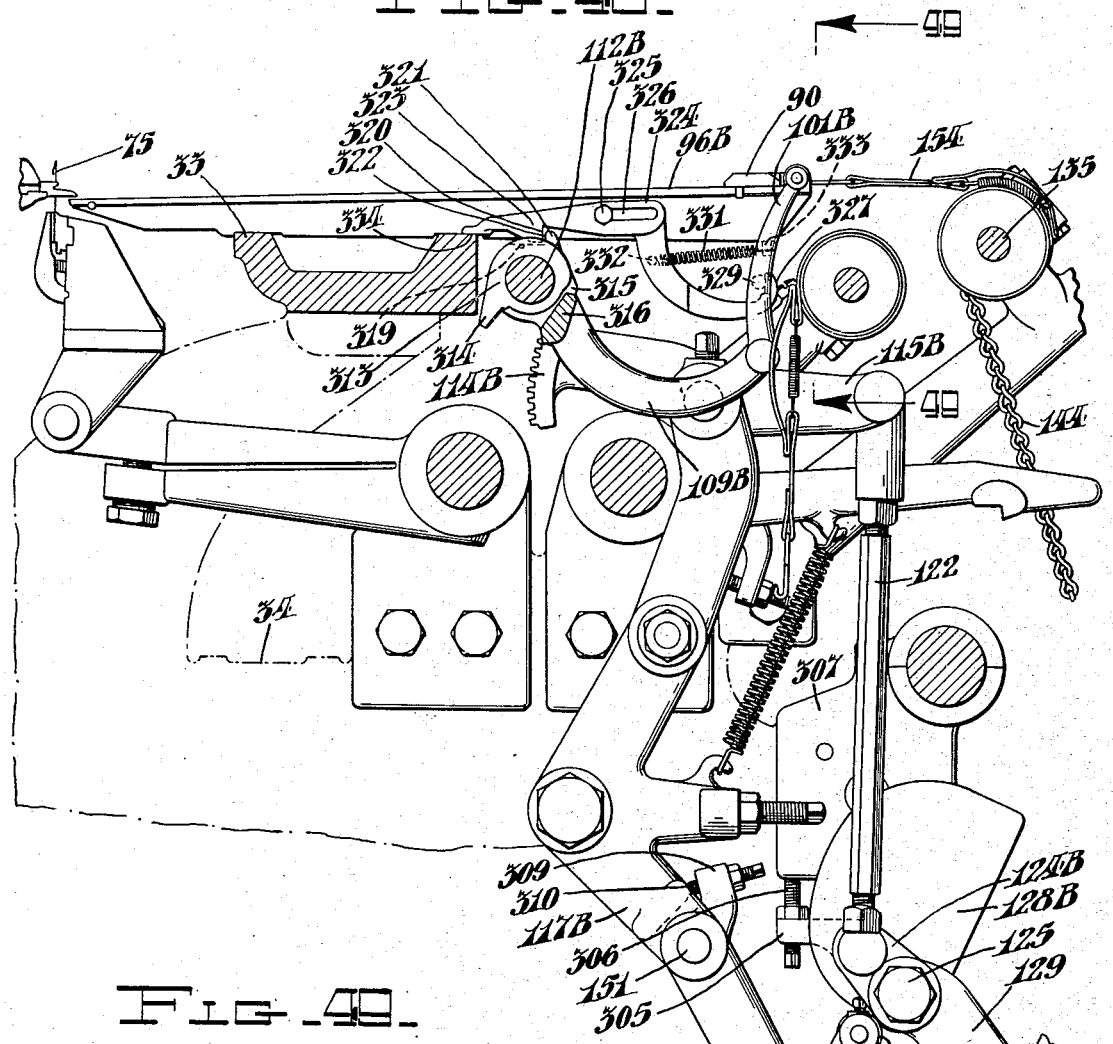
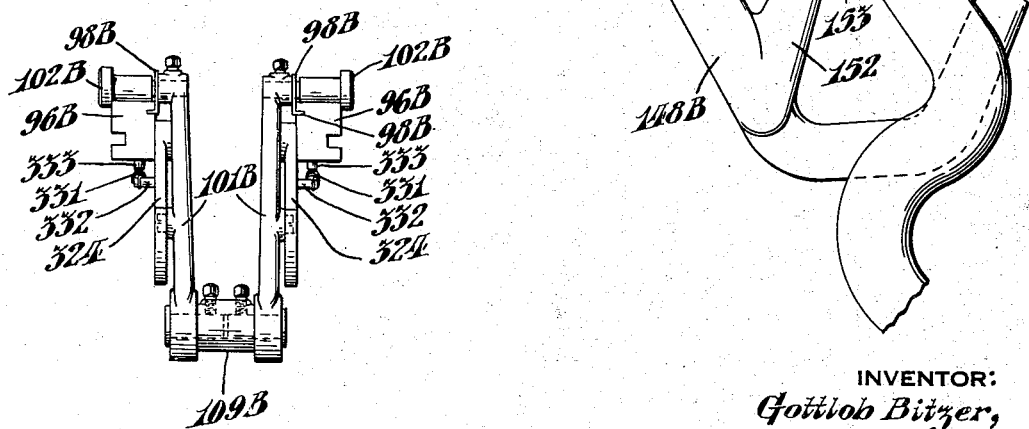
INVENTOR:
Gottlob Bitzer,
BY
ATTORNEY.

Sept. 8, 1942. G. BITZER 2,295,512
WELT BAR HOOKUP APPARATUS
Filed Dec. 30, 1940 20 Sheets-Sheet 20
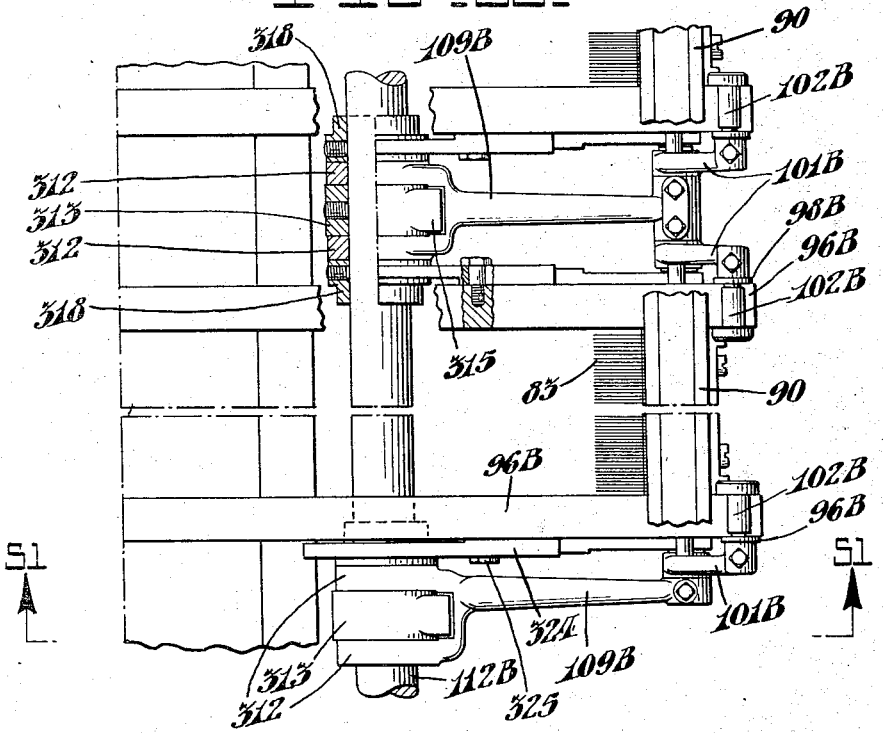
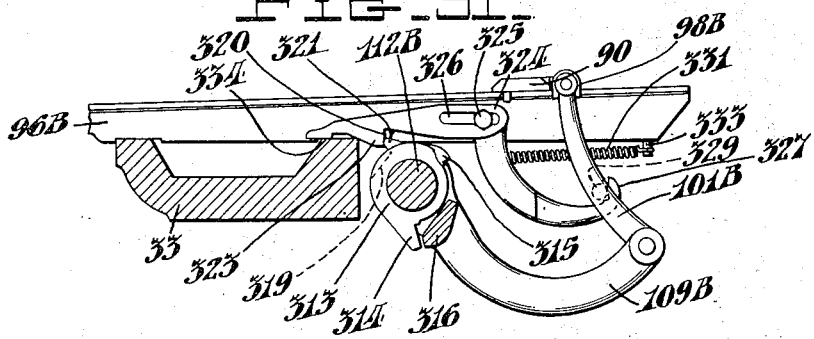
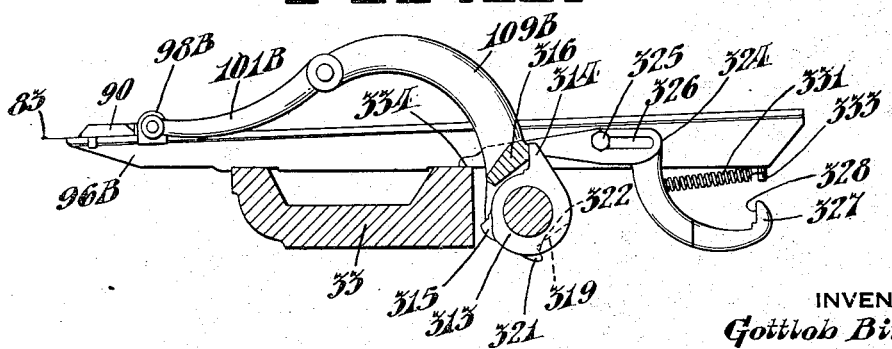
INVENTOR:
Gottlob Bitzer,
BY
Alfred E. Ischinger,
ATTORNEY.

Patented Sept. 8, 1942

2,295,512

UNITED STATES PATENT OFFICE 2,295,512

WELT BAR HOOKUP APPARATUS

Gottlob Bitzer, Lincoln Park, Pa., assignor to Textile Machine Works, Wyomissing, Pa., a corporation of Pennsylvania Application December 30, 1940, Serial No. 372,317

29 Claims. (Cl. 66—96)

My invention relates to manually controlled welt bar hookup mechanisms for use in flat and full-fashioned knitting machines.

Numerous mechanisms have heretofore been proposed for hooking up, or for assisting in hooking up, the welt bars with the first courses of the welts of stockings made on flat or full-fashioned knitting machines. Of these prior mechanisms, the completely or substantially automatic devices are expensive and/or occupy space desirable for other purposes while those of less automatic character have not given sufficient output to be commercially satisfactory and many of them have also had the drawback of occupying space sometimes needed for other purposes.

It is an object of my invention to provide a novel manually controlled welt bar hookup mechanism for flat or full-fashioned knitting machines which is capable of performing its intended function at a substantial saving in overall cost in comparison with fully automatic, or more nearly automatic hookup devices of this type.

Another object of my invention is to provide a mechanism of this type which is highly efficient in operation and adapted to occupy space on a full-fashioned knitting machine of minimum value for other purposes.

It is also an object to provide, in a multi-section flat knitting machine having a mechanical welt bar hook-up arrangement, manually operated means for relieving the draw-off tension from an energized fabric tensioning means at the times it is desired to turn the welts and for keeping the fabric free of tension in all the sections until all the welts have been turned while the fabric tensioning means remains energized and in condition for use without preliminary energizing action.

An additional object is to provide means whereby a welt bar may be readily and accurately centered with respect to the means for moving it toward the needle row but whereby the welt bar is permitted to be readily removed from the means for moving it.

Another object of my invention is to provide mechanism of this type in which main means for advancing the welt bars to engage the initial course of loops and adapted to permit the production of welts up to a certain length is supplemented by an auxiliary means for advancing the welt bars, to permit the production of welts of a length greater than said certain length.

Still another object of my invention is to provide mechanism of this type having manually operated means for simultaneously advancing a group of welt bars and for increasing the potential energy of the draw-off means in such manner that no tension is applied to the welt bars until the advancing means is retracted from the welt bars.

A further object of my invention is to provide a mechanism of this type having means for holding the take-off reel against the action of the take-off weights during the transfer of the initial course of loops back to the needles.

With these and other objects in view, which will become apparent from the following detailed description of the illustrative embodiment of my novel welt bar hookup mechanism shown in the accompanying drawings, my invention resides in the novel elements, features of construction and arrangement of parts in cooperative relationship as hereinafter more particularly pointed out in the claims.

In the drawings:

Figure 1 is a front elevation of a portion of a full-fashioned knitting machine having my invention applied thereto;

Fig. 2 is an end elevational view of the machine shown in Fig. 1, parts being omitted and others being shown in section for purposes of illustration;

Fig. 5 is a plan view of a portion of the apparatus within my invention shown in Figs. 1 and 2, being enlarged relative thereto;

Fig. 6 is a sectional view of the apparatus taken substantially along the line 6—6 of Fig. 1;

Fig. 7 is an enlarged detail view of certain of the elements shown in Fig. 6;

Fig. 8 is a fragmentary detail view of the latch means shown in Fig. 6;

Fig. 9 is a front view of a portion of the mechanism shown in Fig. 6;

Fig. 10 is a view similar to Fig. 9, showing parts broken away and others in different relative positions;

Fig. 11 is a sectional view taken substantially along the line 11—11 of Fig. 6;

Fig. 12 is a sectional view taken substantially along the line 12—12 of Fig. 6;

Fig. 13 is a sectional view taken substantially along the line 13—13 of Fig. 6;

Fig. 14 is a sectional view taken along the line 14—14 of Fig. 13;

Figs. 19, 20, 21 and 22 are detail views similar to Figs. 15 and 18, but showing the action of welt hooks for receiving the loops of the first course in accordance with my invention;

Figs. 23, 24 and 25 are sectional views showing portions of a loop engaging apparatus within my invention and the position of the parts thereof at the time just after engaging the loops of the first course of the welt, just before turning the welt and just after turning the welt, respectively;

Fig. 26 is a view, taken substantially along the line 26—26 of Fig. 1, of a draw-off mechanism of the type preferably used by me on knitting machines equipped with my invention;

Fig. 27 is an enlarged detail view of a portion of the mechanism shown at the top of Fig. 26, with the parts being in different positions and being enlarged relative to Fig. 26;

Fig. 28 is a view taken substantially along the line 28—28 of Fig. 27;

Fig. 29 is a sectional detail view of a bearing for a draw-off reel taken along the line 29—29 of Fig. 27;

Fig. 30 is a sectional view taken substantially on the line 30—30 of Fig. 26;

Fig. 31 is a sectional view taken substantially on the line 31—31 of Fig. 26;

Fig. 32 is a detail elevational view taken from the right of Fig. 26;

Fig. 33 is a detail sectional view taken substantially on the line 33—33 of Fig. 26;

Fig. 34 is a detail sectional view taken substantially on the line 34—34 of Fig. 26;

Fig. 35 is similar to Fig. 34 but certain parts of Fig. 34 are omitted in Fig. 35 and certain parts are shown in another position;

Fig. 36 is a sectional view taken substantially on the line 36—36 of Fig. 26;

Fig. 37 is a detail of a portion of Fig. 26, the parts shown being in position assumed during a narrowing operation;

Fig. 38 is similar to Fig. 37, the parts being shown in the position appropriate to a lace making operation;

Fig. 39 is a detail of a portion of Figs. 37 and 38;

Fig. 40 is a sectional view of a modified form of the apparatus within my invention;

Fig. 43 is a sectional view taken substantially along the line 43—43 of Fig. 41;

Fig. 44 is a sectional detail view taken substantially on the line 44—44 of Fig. 43;

Fig. 45 is a sectional detail view taken substantially on the line 45—45 of Fig. 43;

Fig. 46 is a front elevational view on a small scale of certain parts appearing in Fig. 40;

Fig. 47 is a sectional view showing certain parts appearing in Fig. 43 in different relative positions;

Fig. 48 is a view similar to Fig. 6 of an apparatus having the same principle of operation as that shown in Figs. 1 through 25, but permitting greater traverse of the welt bars;

Fig. 49 is a detail elevational view taken substantially along the line 49—49 of Fig. 48;

Fig. 50 is a plan view partly in section of a portion of the apparatus shown in Fig. 48;

Fig. 51 is a sectional view taken substantially on the line 51—51 of Fig. 50, looking in the direction of the arrows and with certain parts in different positions relative thereto; and Fig. 52 is a view similar to Fig. 51 but showing the parts in different relative positions.

Figure 3:
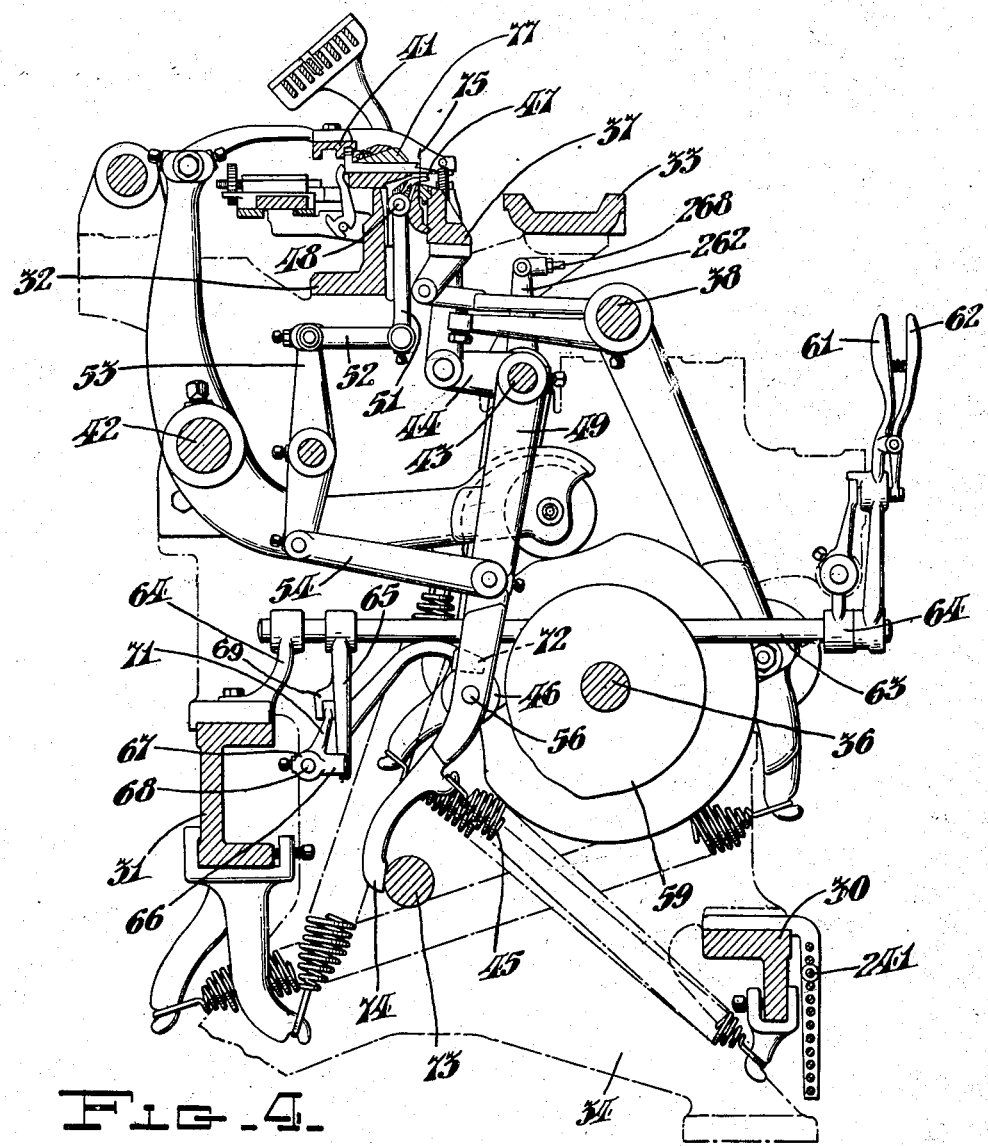
Fig. 3 is a sectional view of a full-fashioned knitting machine of the type shown in Figs. 1 and 2 showing more particularly the loop forming elements and associated mechanisms.

In the drawings and description, only the means necessary to a complete understanding of the invention have been specifically set forth; further information as to the construction and operation of other related, usual and well known knitting machine elements, mechanisms, etc., may be found in one or more of the following publications:

1. Pamphlet entitled, Full Fashioned Knitting Machines, published and copyrighted by the Textile Machine Works, Reading, Pennsylvania, in 1920.

2. Three catalogs entitled, The "Reading" Full-Fashioned Knitting Machine Parts Catalog, published and copyrighted by the Textile Machine Works, in 1929, 1935 and 1940, respectively.

3. Booklet entitled, The "Reading" High-Production Full-Fashioned Knitting Machine, which forms a supplement to the above noted 1940 parts catalog of the Textile Machine Works, and which booklet is a publication of the Textile Machine Works, and was copyrighted by the latter in 1940.

4. Pamphlet entitled, Knitting Machine Lectures, published by the Wyomissing Polytechnic Institute, Wyomissing, Pennsylvania, in 1935.

The apparatus within my invention shown in the drawings is of a semi-automatic type and comprises a welt bar having welt hooks therein adapted to engage the first length of yarn laid to the needles of a knitting machine, a pusher for said bar, means whereby said pusher is moved rearwardly manually to a position in which the bights of the said first length of yarn are drawn into engagement with said hooks by the needles, means for drawing said bar and its hooks forwardly from the needles during the knitting of the welt, and a draw-off means to take up the remainder of the stocking fabric, said means for drawing the bar forwardly adapted to act on the bar immediately the bar has been freed for forward movement by the means whereby it was moved rearwardly.

The knitting machine

The knitting machine shown in Figs. 1, 2 and 3 of the drawings comprises a framework of the type ordinarily used in the "Reading" full-fashioned knitting machines, including a front beam 30, a back beam 31, a center bed 32, a front bed or table 33, end frames (not shown), and center frames 34. Also the usual main cam shaft 36, needle bar 37, needle bar shaft 38, catch-bar 41 and back catch-bar shaft 42 with their necessary cams, cam followers and levers are all employed and shown. The front catch-bar shaft is shown at 43 and has a bell lever 44 fixed thereto, one portion of which extends rearwardly and horizontally, being connected to the catch bar in the usual way. The other portion of bell lever 44 depends from shaft 43 and has a cam follower thereon for receiving motion from a cam on shaft 36 in the usual way. Adjacent lever 44 on shaft 43 is a lever 49, the upper end of which is journalled on shaft 43. At its lower end, lever 49 has one end of a spring 45 attached thereto, the other end of which is attached to the front beam 30 to draw the lever 49 forward into the position in which a cam follower 46 journalled on an axle 56 carried by the lever may cooperate with a cam on shaft 36. The follower 46 cooperates during the knitting of the body of the fabric with the usual cam 57 (Fig. 1) for lifting and lowering the knockover bits 47.

It is desired to either hold the knockover bits 47 stationary, or to give the ends greater or less motion according to circumstances. For this purpose, knockover bits 47 are mounted on a pivoted shaft 48 to which is fixed a downwardly extending lever 51, the lower end of which is pivotally connected to a link 52 which is pivoted in turn to the upper end of a pivoted rock lever 53. The lower end of rock lever 53 is pivotally connected by link 54 to lever 49 at a point somewhat above the cam follower 46. When it is desired to use the welt hooks, the bits 47 are kept stationary and in their lowest position, while knitting the first course. At this time, cam follower 46 is shifted by the operator along its axle 56 so as to lie outside the plane of revolution of any cam on shaft 36. The spring 45 will then throw the lever 49 so that its lower end 74 strikes a bar 73 fixed on the machine frame, thereby bringing bits 47 into their lowest position in which there is ample room for the welt hooks between the sinkers and the knockover bits, but the bits can support the hooks so far as may be necessary. For the purpose of shifting follower 46, a hand lever 61 is provided having a releasable setting latch 62 whereby the lever 61, and thereby the follower 46, may be fixed in desired positions. As shown in Fig. 1, the lever 61 has a generally vertical position and its lower end is fixed to a generally horizontal shaft 63, pivoted in brackets 64, which runs from front to rear of the machine. Lever 61 is fixed to the front end of shaft 63, and, near its rear end, shaft 63 has a lever arm 65 fixed thereto which depends therefrom so as to be embraced by a fork 66 extending horizontally from a casting 67 fixed on a horizontally slidable rod 68. Casting 67 has an upwardly extending portion 71 engaging with an offset portion 69 of lever 65 to prevent the rod 68 from turning. The rod 68 is provided with a forked arm 72 embracing the edge of cam follower 46. Therefore, by swinging lever 61, the operative may swing lever arm 65 to shift cam follower 46 into or out of the plane of cam 57 to control the action of the knockover bits 47. After the welt hooks have engaged the yarn for the first course, follower 46 is then shifted to cam disk 58 (Fig. 1) which gives the knockover bits a relatively slight motion compared to the ordinary knitting cam 57. The follower 46 is kept on cam 58 for about eighteen courses so that the welt hooks may move out of the path of the knockover bits before the cam follower is shifted to cam 57. A third cam disk 59 is shown alongside cam 58 and cam follower 46 may be shifted to cooperate with cam 59 when desired, cam 59 being designed for heavy work.

Figure 15:
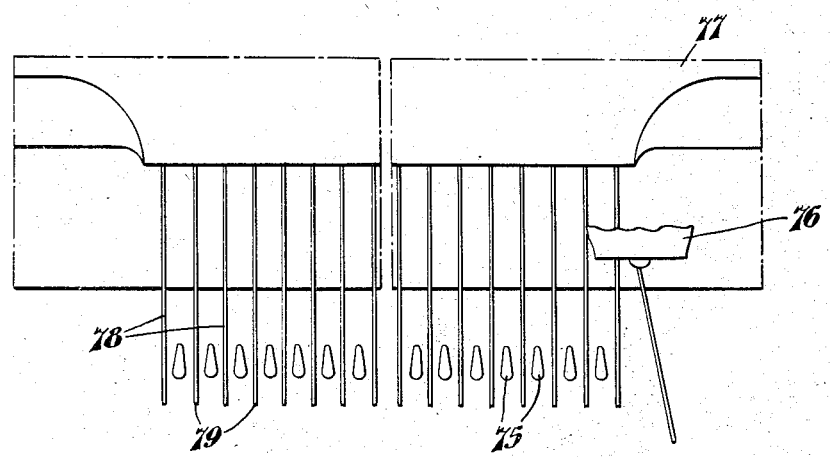
Figs. 15, 16, 17 and 18 are greatly enlarged views of loop forming elements of a full-fashioned knitting machine showing the steps of laying and kinking the yarn for the first course of a knitted fabric.
Figure 16:
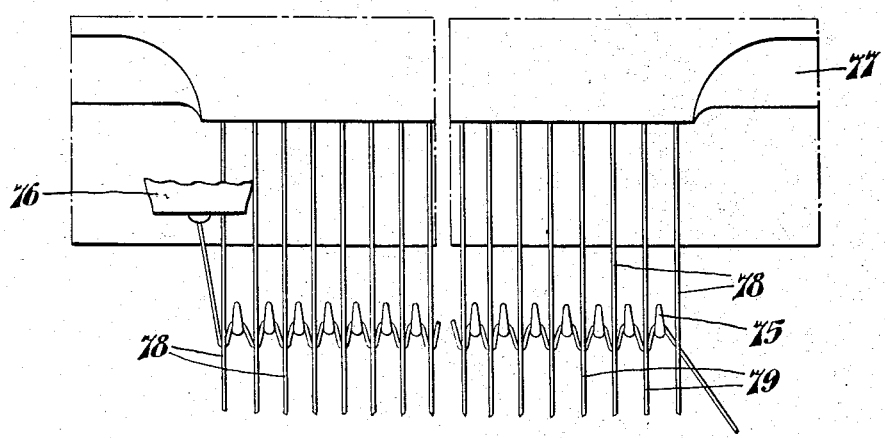
Figure 17:
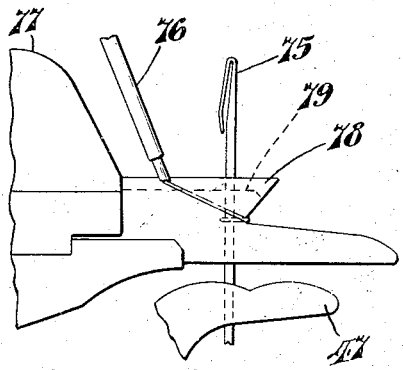
Figure 18:
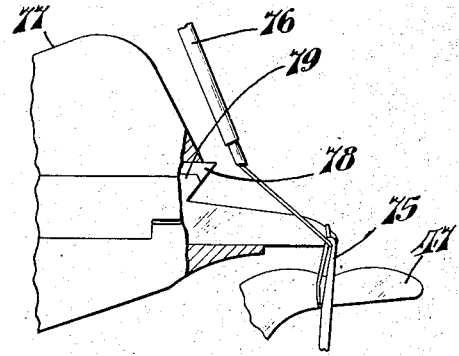

The welt hooks are used in connection with the first length of yarn laid to needles 75, at the beginning of a piece of fabric. As shown, the needles 75 are arranged in a row or bank in each needle bar 37. The means shown for laying yarn to the needles is of a commonly used type and comprises a yarn carrier 76 (Figs. 15 to 22) which reciprocates horizontally between the needles 75 and a sinker-head 77 to lay the yarn along the noses of the sinkers 78, and dividers 79. The relation of the parts immediately preceding the beginning of the motion of yarn carrier 76 to lay the first length of yarn at the start of a piece of knitted fabric is shown in Fig. 15. As the yarn carrier moves along its course, the sinkers are advanced to engage the yarn in their throats and draw a proper length of it from the carrier, this action not being shown. The sinkers are then retracted somewhat and the dividers advanced to bring the parts into the position shown in Fig. 16 in which the sinkers and dividers project between the needles to press the yarn against the shanks of the needles to form a loop for each needle. After the loops have been formed by the sinkers and dividers as shown in Figs. 16 and 17, the sinkers and dividers move rearwardly into the sinker bed so that the loops move forwardly, relatively speaking, on the noses of the sinkers and dividers to the point shown in Fig. 18 and shortly thereafter drop from the sinkers and dividers onto either welt hooks or onto knockover bits 47, depending on the position of the welt hooks.

The hook-up

Before the loops of the first course thus drop, however, in accordance with my invention, welt hooks 83 are moved rearwardly from a position in front of the needle bank so that they extend between the needles and their hook ends lie beneath the sinkers and dividers and above the knockover bits as shown in Figs. 19 and 20. Therefore, when the loops of the first course drop from the noses of the sinkers, they catch on the hooks 83 as shown in Fig. 21. The welt hooks are then drawn forward as shown in Fig. 22, so that the loops are pulled against the shanks of the needles in position to be knitted with the next length of yarn laid by carrier 76 and the forward motion of the hooks 83 is continued gradually as successive courses of the welt 84 (shown in Fig. 24) of the stocking are knitted until a considerable portion of the welt has been knitted, at which time, the attendant places a welt rod on the welt as shown in Fig. 24. Shortly thereafter, the full number of courses for the welt having been knitted, the machine is stopped, welt bars 85 in which the hooks 83 are fixed are disconnected from the means by which they were drawn forward and the loops of the first length of yarn laid to the needles and in which the welt hooks had been engaged are placed on the needles by hand. The welt rod having already been laid on top of the fabric, it is thereby enfolded in the welt and, the draw-off having been then attached to the welt rod in the customary manner, knitting is continued in the usual way.

Two different means are shown by which welt bars 85 are advanced and retracted in accordance with the present invention. One such form or modification of the apparatus within the invention is shown in Figs. 1, 2 and 5 to 14, inclusive, and another in Figs. 40 to 47, inclusive. Both forms of apparatus move the welt hooks rearwardly and forwardly as previously described in connection with Figs. 19 to 22, inclusive, and permit the operatives to remove the bars carrying the welt hooks from the means for moving them whereby the initial rows of loops may be replaced on the needles by the operatives.

Referring more particularly to Figs. 6 to 14, each bar 85 for supporting a group of welt hooks 83 comprises an upper plate 90 and a lower plate 91. The hooks 83 are arranged to project horizontally from the rear edge of the bar 85, the butts and parts of the shanks of the hooks being clamped between plates 90 and 91 as shown in Fig. 14, and they are aligned with the sinkers 78 and dividers 79 (Fig. 19) so that, when the bars 85 are moved rearwardly, the tips of the hooks move in between the sinkers and dividers and the knockover bits 47 (Fig. 20) in position to receive the first row of loops from the sinkers and dividers; whereby the curved rear ends of the hooks 83 are enabled to draw the loops forward when the bars 85 are drawn forward. The bars 85 are adapted to move rearwardly and forwardly with respect to the knitting machine and its needle banks on horizontal rails or bridge members 96 extending at right angles to the vertical plane of the needle banks, a spaced pair of said rails being provided in each knitting section for each welt bar.

The welt bars 85 are moved rearwardly toward the needles on the rails 96 by means of studs or traveller members 102 which rest upon the rails 96, as shown in Fig. 13. The studs 102 are provided with head portions 104 which co-act with the welt bars 85 in a manner hereinafter set forth. The studs 102 have a reduced portion 103 secured to links or levers 101 by means of a set screw 99 and are further provided with guide members 98 adapted to slide in grooves 97 in the outer faces of rails 96 and which maintain the studs 102 in definite position relative to the top surface of rails 96 upon which the studs slide.

As is shown in Fig. 5, the welt bars 85 are placed on top of rails 96, being roughly centered thereon by pins 105 (Fig. 7) which project downwardly from the underside of plates 90 where these project beyond the rails. Welt bars 85 are also further centered with respect to rails 96 and the pressure of heads 104 transmitted to the bars by plates 106 attached to the rear edges of plates 90 of the welt bars by screws or other suitable means. Plates 106 have rearwardly projecting flanges 107 (Figs. 5 and 13) lying alongside the inner vertical sides of rails 96 when the bars 85 have been placed on the rails so the pins 105 are on the outside thereof. Flanges 107, further, have arcuate recesses 108 thereon (Figs. 7 and 14) arranged to fit against the cylindrical surfaces of heads 104 to receive the forward thrust therefrom and also fit against the flat ends of heads 104 (Fig. 5) to center the bars 85 with respect to the studs 102 and thereby with respect to the needles.

A cycle of movements of one of the welt bars 85 is assumed to begin when the bar is at the point in its path farthest forward, that is farthest from the needles as shown in Figs. 2 and 5. At this point studs 102 rest against stop plates 100 fixed to the tops of rails 96. A stocking having been finished off and it being desired to start another stocking, each welt hook bar 85 being in the position shown in Fig. 25, the mechanism according to the invention is then operated by the attendant so that links 101 push the studs 102, and thereby the bars 85, rearwardly toward the needles until the pins 105 on the welt bars strike against pins 110 (Fig. 7) which are fixed in rails 96 and project laterally therefrom at the level of grooves 97 into the path of pins 105.

Means for swinging links 101 to operate studs 102 comprise arms or levers 109 (Fig. 6) fixed to a shaft 112 on which is fixed in turn a pinion 113. Meshing with pinion 113 is a segment gear 114 fixed to the upper end of lever 115 journalled on a pivot pin 116 about midway of the length of the lever, and held by the upper ends of two brackets 117 and 118 (Fig. 11) fixed on the frame of the machine. The lower and forward end of lever 115 is pivotally connected at 119 to the upper end of a link 122, the lower end of which is fixed to a pivot pin 123 journalled in a crank block 124 pivoted on a bolt 125 (Figs. 6 and 12) fixed in a frame member of the machine. Block 124 is machined to receive a collar 126 through which pin 123 extends when the parts are in assembled position and the collar is fixed to pin 123 by a set screw 127 to prevent pin 123 from moving in block 124 in the direction of the axis of the pin. Block 124 is also machined to receive a plate cam 128 which is apertured so that pin 123 and bolt 125 pass through it and hold it against moments tending to turn it relatively to block 124 as well as against forces tending to dislodge it from its socket in the block. An arm or lever 129 is shown as formed integral with block 124, and as having a handle 132, whereby the attendant may turn block 124 and cam 128 on bolt or pin 125. When lever 129 is moved into the position shown in Fig. 2 in which the crank block 124 holds pin 123 and link 122 up, the segment gear 114 is thereby held down and the arms 109 and 101 and the studs 102 are all as far forward as possible on rails 96. A single lever 129 and handle 132 are used to simultaneously manipulate all of the welt bars from the positions shown in Fig. 2 to the positions shown in Fig. 6 due to the fact that the shaft 112 which carries all of the welt bar operating levers extends across the entire length of the machine.

Figure 4:
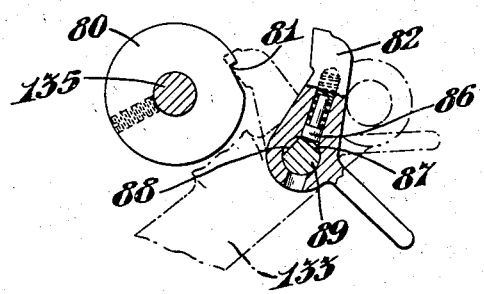
Fig. 4 is a view taken substantially along the line 4—4 of Fig. 1, certain parts being broken away and shown partly in section and other parts being shown in dot-and-dash outline.

In the extreme forward position of studs 102 the welt bars are placed on rails 96 in operative position relative to studs 102, and means is attached thereto in each knitting section, for applying tension to the welt bars to tension the fabric during the knitting of the welt. Tensioning means for this purpose is shown in Figs. 5 and 6, and comprises a drum 134 (Fig. 2) fixed to one end of a shaft 135 rotatably carried in brackets 133, one of which is shown in Fig. 6, fixed to the machine frame. The shaft 135 also has secured thereto, a collar 80 (Fig. 4) having a notch 81 formed in its outer periphery which is adapted to be engaged by a pawl 82. The pawl 82, mounted on a stud 89 carried by one of the brackets 133, carries a spring-pressed pin 86 adapted to engage flats 87 and 88 to maintain the pawl either in its full line or dot-and-dash line position, shown in Fig. 4, for purposes hereinafter set forth. Wound on the drum 134 is a rope 136 which extends upwardly and rearwardly from the drum over a pulley 137 supported from the machine frame and then downwardly to a weight 138, thereby permitting the rope 136 to apply a torque to shaft 135 in the clockwise direction as viewed in Fig. 2. At a convenient position on shaft 135, a collar 143 (Figs. 5, 9 and 10) is fastened thereon and a chain 144 is attached to collar 143 by a headed pin or bolt 145. Chain 144, after taking a turn or more around a helically grooved drum 146, extends to a pin 147 for connecting the chain on the forward end of lever 148, pivoted at 151 to the lower end of bracket 117. Lever 148 has an arm 152 fixed thereto and extending forwardly from the midsection thereof. The arm 152 lies in the plane of the cam 128 and has journalled at its free end a cam follower 153 arranged to cooperate with the edge of cam 128. It follows from the arrangement of lever 148 and cam 128 that, when lever 129 is drawn up into the position shown in Fig. 6, lever 148 is forced down, 223 is repositioned relative to ratchet 224, one of a series of holding pawls 226 then retaining the ratchet wheel 224 and shaft 210 in more advanced position relative to pawl 223. The impulse from cam 225 is transmitted to yoke 215 through a train of mechanism including a cam follower 227 journaled on a lever 228 which is fixed to a pivot shaft 229, on which is also a lever arm 230, the forward end of which is forked to embrace the yoke 215 so as to extend beneath a pin 247 on each side the yoke to lift it when the cam follower 227 bears against the high point of its cam. In order that the tension supplied by springs 211 may be as constant as possible, the pawls 226 are of different lengths, the difference between the length of the shortest and the longest of these pawls, however, being less than the distance between two teeth on ratchet wheel 224. The backlash of the ratchet wheel 224 is thereby limited to a minor fraction of the distance between two teeth.

In order to automatically vary the tension on the fabric as the width of the fabric is varied during knitting, means are provided whereby one or more of the springs 211 may be thrown out of action by the pattern chain. At 241 (Fig. 26), I have shown one of the series of rods operated by the pattern chain at desired points in the cycle in a well known manner. Rod 241 has a collar 242 adapted when so operated to oscillate a bell-lever 243, the upper end of which is arranged to control the racking of a horizontal shaft 244 to which is fixed a disk 245 carrying horizontal pins 246 of different lengths. The means for racking shaft 244 and thereby the pins 245 under the control of the rod 241 comprises a ratchet 207 fixed to shaft 244 and a pawl 249 for racking the ratchet 207. Pawl 249 is pivoted to a lever 263 journalled on the shaft 244 and oscillated at desired times by a spring 184 and a link 264 pivotally connected at one end to lever 263 and at its other end to the free end of a lever 271. The other end of lever 271 is pivoted in a part fixed to bracket 248, which bracket is rigid with the bracket 219 previously mentioned. Between its ends lever 271 has pivoted thereto a lever 275. The lever 275 extends generally in a vertical direction when active and its pivot is substantially at its central point, the lower end of this lever having a pin 276 thereon whereby lever 275 may be rocked into or out of active position by means of the lever 243 and rod 241. At its upper end, lever 275 is bent horizontally and has a contact screw 277 adapted when lever 275 is in its substantially vertical position to contact a lug 278 which projects from lever 230 at the inner end of the forked portion thereof. It follows that when lever 243 is moved to throw lever 275 into the vertical position shown in Fig. 35, lever 275 is moved up by the lever 230 on each of its upward movements, thereby lifting lever 271 and link 264 and turning lever 263 counterclockwise to rack the shaft 244. A spring pressed plunger 208, cooperates with a notched wheel 209 carried by the shaft 244 (Fig. 36) to prevent accidental movement of the shaft 244. The oscillation of lever 263 is completed by spring 184 which is connected so as to move lever 263 clockwise to thereby reset pawl 249 to engage it with another tooth on ratchet 207 and to cause lever 275 to follow lug 278 downward on the downward movement of lever 230. However, when lever 243 is moved by rod 241 to throw lever 275 into the inclined position shown in Fig. 34, shaft 244 remains stationary and the tension on the fabric produced by springs 211 will remain unaltered by pins 246 until a further movement of shaft 244. When shaft 244 is in a certain angular position, the shorter of pins 246 is adapted to contact the lever to which is connected one of the springs 211 to sustain the tension of such spring and thereby to prevent it from acting on the fabric through rod 221 and connected parts. When shaft 244 has been turned to another angular position, a somewhat longer pin 246 will contact the levers of two springs 211 to further decrease the pull on the fabric. In this way, by providing a suitable number of pins 246, the pull on the fabric during knitting may be varied automatically over a very wide range, it being usual to throw the springs 211 all out of action at the time the heel tabs are being made.

It is usually desired that there should be a reduced tension or none at all on the fabric during the period of narrowing and, in order to provide full or a desired degree of release of the tension during such periods, a cam 232 is provided on shaft 36 with which follower 227 engages when the cam shaft has been shifted to narrowing position. Cam 232 permits more lift of the lever arm 228 and more dip of the lever arm 230 than cam 225 and provides sufficient lift of arm 230 at its high point so that the fabric tension may be fully released by means about to be described.

A second forked lever 218 is pivoted to the forward ends of the forked part of lever 230 (Figs. 32 and 39) and carries a rearwardly projecting pawl member 217 at its upper end adapted to engage with a rack 216 which is fixed to and projects upwardly from the yoke 215. Normally, member 217 does not coact with rack 216 except during a narrowing operation, being held away from the rack by collars 238 on the forward end of a rod 234 which extends through a lateral extension or ear on the upper end of lever 218 and extends thence rearwardly through a bearing portion 237 of a lever 235 in which it has a sliding fit. Bearing 237 stands in contact with the rear face of a collar 231 fixed on the rod 234, so that rod 234 is normally held forward in the desired position and so that the member 217 and rack 216 do not contact in the usual up and down movement of yoke 215 and rack 216 during the knitting cycle. When, however, the cam shaft 36 shifts to initiate a narrowing cycle or a lace making cycle, the side of cam 225 presses against a portion 233 at the rear end of the lever 235 which is mounted to swivel on a vertical axis passing through a part 236 (Figs. 26 and 37) of the bracket 248 fixed to the machine frame. As lever 235 is swung by cam 225 it swings bearing 237 to the left as viewed in Figs. 26 and 31 and, at the same time, a hook 239 on the lever 235 which is connected to the rear end of a spring 240, the other end of which is connected to rod 234, is swung rearwardly so as to tension spring 240 and unless prevented, pull rod 234 also to the left to permit pawl member 217 to engage rack 216 during the first part of the upward movement of lever arm 230 and lever 218. The upward lift of yoke 215 therefore begins sooner in the narrowing cycle than if the fork on arm 230 acted to contact the pins 247 on yoke 215 to begin the upward movement of the yoke 215, and the tension of springs 211 may therefore always be completely released by yoke 215 acting through lever 218.

However, the degree of release occurring during the narrowing or lace forming cycle is controllable to a considerable extent by the knitter.

thereby drawing down the lower end of chain 144 and turning shaft 135 counterclockwise. Counterclockwise motion of shaft 135 thereupon turns drum 134 to wind up rope 136 and raise weight 138. At the same time that weight 138 is raised, studs 102 are moved rearward as previously described so that the welt bars 85 are moved rearwardly to bring welt hooks 83 between the sinkers and knockover bits in position to receive the first rows of loops. At the same time the shaft 135 winds up the weight 138, thereby increasing the potential energy of the auxiliary fabric tensioning means of which shaft 135 and weight 138 form parts, it unwinds straps or bands 154 from drums 155 (Fig. 5) one of which is fixed to shaft 135 at each knitting section. Each of straps 154 has a hook 156 at its free end adapted to be engaged in an eye 157 fixed to the front edge of a welt bar 85. The cam 128 is designed to wind up weight 138 slightly in advance of the rearward movement of the welt bars 85 and consequently no tension is applied to the welt bars at this time.

In operating the apparatus shown in Figs. 1 to 25, inclusive, the parts being in the position shown in Fig. 25, with the welt bars forward and the auxiliary draw-off bands 154 connected to the bars 85, the operator raises the handle 132 to swing lever 129 from the position shown in Fig. 2 to that shown in Fig. 6 in which the lever 129 engages a stop member 130 on the bracket 117 to determine the extent of the counterclockwise movement of the lever 129. The lever 129 is maintained as long as desired in its position of Fig. 6 by a latch lever 160 which engages a stud 166 on the lever 129 (Figs. 6 and 8). Due to the connection furnished by link 122, lever 115, gear segment 114 and pinion 113, arms 109 and 101 are thereby swung to move the welt bars 85 rearwardly on their rails 96 to the position shown in Figs. 6 and 7 in which the welt hooks 83 are able to receive the first course of loops. By the same motion of the lever 129, cam 128 is turned to force down the forward end of lever 148 to unwind the chain 144 from the drum 146, thereby turning shaft 135 so as to wind up rope 136 and raise weight 138. As soon as the first course of loops has been drawn down onto the hooks 83 by the machine needles and each bar 85 thereby held rearwardly by the loops, handle 132 is lowered by the operator and lever 129 is moved back to its position of Fig. 2 to throw the pull of weight 138 on the fabric by moving the studs 102 out of contact with the bar 85 and to again position the studs 102 against the stop plates 100.

The knitting thereupon continues until approximately half of each of the welts has been formed and the operative then places a welt rod 150 on top of the fabric and in grooves 159 in the inside vertical faces of rails 96 and pushes the welt rods against stops 163 fixed to the lower faces of rails 96 and projecting through slots 158 (Fig. 23) into grooves 159.

When the knitting has continued for the full extent of the welt fabric necessary to form the two ply welt, the machine is stopped, preferably by the action of the pattern chain. At this time the welt bars 85 have not quite contacted the studs 102 and the welt bars are still tensioned by the weights 138. The operative then rotates the shaft 135 in a counterclockwise direction so that when the pawl 82 is moved from its full line position to its dot-and-dash line position, of Fig. 4, the pawl will engage the notch 81 to prevent rotation of shaft 135 in the take-off direction, thereby relieving the tension on the welt bars 85. The operative then lifts each welt bar 85 from its rails 96, unhooks the strap 154 from the welt bar and transfers the loops on the welt hooks 83, these forming the first course, back to the needles, thereby forming the usual two ply welt. As each welt is turned, the welt bar 85 is replaced on its rails 96 and the strap 154 again hooked to the welt bar. When all the welts are turned, the operative again moves the pawl 82 to its full line position of Fig. 4, thereby setting the tensioning means and positioning the welt bars 85 (Fig. 25) for the next rearward movement thereof. Turning of the welt encloses the welt rod 150 within the two ply part of the welt, whereupon hooks 161 of a harness 162 of a main draw-off mechanism E (Figs. 26 to 39) are attached to the welt rods 150. The knitting is then continued to form the single ply sections of the stocking blanks.

*Draw-off mechanism*

As has been mentioned, the harnesses attached to the welt rods after the welts have been turned are tensioned by a means operating through reels or drums 182. This tensioning means is analogous in operation to any of the well known fabric draw-off mechanisms, such as shown in the patent to Richter, No. 2,004,219, and to that shown in the patent to Ischinger, No. 2,101,048. The drums 182 are fixed to a shaft 210 which is turned in the clockwise direction as viewed in Figs. 26 and 27 by a resilient means maintaining a desired but adjustable tension on the fabric to draw it off as knitted. The shaft 210 is rotatably carried by brackets 200 mounted on a shaft 190.

The resilient means whose tension is applied to the fabric is shown as comprising a series of springs 211, of which five are shown. The upper ends of springs 211 are hooked to a bar or pin 212 which is adjustable with relation to a standard 213 by a handle 214 to vary the average tension of each of the springs 211. The lower ends of the springs 211 are attached to levers 194 (Fig. 33) by pins 300 which are notched to permit adjustment of the ends of the springs 211 closer to or farther from the pivots of the levers 194 to thereby permit adjustment of the tensioning effect of any one of the springs. Said levers 194 whereby the tensions of springs 211 are delivered are of a simple lever construction and the ends on the opposite sides of their pivot points from the spring connections therewith are arranged as shown at 149 (Fig. 33) to overlap and to draw down on the lower bridge portion of a yoke 215 mounted for vertical movement in a bracket 219. For transmitting the downward pull of said levers, the yoke 215 is connected by a clevis 220 to a rod 221 the upper end of which is pivotally connected to a lever 222 journalled on the shaft 210 and projecting therefrom on the side opposite rod 221. Said latter projection of arm 222 has pivoted thereon a pawl 223 adapted to engage the teeth on a ratchet wheel 224 fixed to the shaft 210 (Fig. 29). Vertical motion of the rod 221 due to springs 211 is thereby transmitted to shaft 210.

As the fabric is knitted and permits the shaft 210 to turn, the tension on the springs 211 naturally tends to decrease. In order to retension the springs 211, a cam 225 is provided on the main cam shaft 36 which serves to lift the yoke 215 and rod 221 at each revolution of shaft 36, thereby retensioning the springs 211 as pawl Not so much release is desired during lace making as during narrowing, although the cam shaft 36 is shifted the same way and to the same extent in both instances. Therefore, two cams 250 and 251 (Figs. 26, 30, 31, 37 and 38), carried by a member 280 which is pivotally mounted for limited movement on the bracket 219 in which yoke 215 is guided, are so arranged as to contact a roller type follower 252 rotatably mounted at 253 on one side of the lever 218 to prevent racking member 217 from engaging rack 216 sooner than desired during the upstroke of lever 218 in the narrowing cycle. To obtain the proper adjustment of cams 250 and 251 for this purpose, the cams 250 and 251 are made vertically adjustable on the bolt 255. A lug 298 on member 280 engages a set screw 299 on the bracket 219 whereby cams 250 and 251 are prevented from turning in the counterclockwise direction as viewed in Fig. 26, beyond the vertical position, in which the narrower cam 250 does not act on follower 252 during the narrowing operation, so that maximum release of tension is obtained within the limit fixed by the vertical setting of cam 251.

The relative positions of the parts when full release is desired during a narrowing operation are shown clearly in Figs. 37 and 38. In Fig. 37, the follower 252 will roll off the wide cam 251 to the narrow cam 250, as shown in Fig. 38, thereby permitting the pawl 217 to engage one of the teeth of the rack member 216 to raise the yoke 215 with the lever 230 and release the tension of springs 211.

During lace making, however, cams 250 and 251 are both operative due to the fact that they may be turned clockwise with member 280 as viewed in Fig. 39 by pulling strongly enough on a handle 256 (Fig. 39) fixed on a bell-lever 257 pivotally connected to member 280 at 258 so that a dog 259 at the forward end of the upper arm of lever 257 may latch over a holding lug 260 fixed to the bracket 219, the lever 257 being then held in latching position, until released by the operative, by a spring 261 attached between bracket 219 and the lower arm of lever 257. The cams 250 and 251 are thereby held forward as shown in Fig. 39, so that no engagement, or only a belated one, occurs between racking member 217 and rack 216 when the follower rolls off the cam 251 because the narrower cam 250 is far enough forward to itself prevent pawl 217 from engaging rack 216 so long as follower 252 is against the flat side of the cam 250. When the desired lace courses have been made, latch lever 257 is released to permit member 280 and cams 250 and 251 to return to vertical position. As dog 259 on lever 257 rests on lug 260 when unlatched, spring 261 serves to draw the member 280 and cams 250 and 251 in the counterclockwise direction to hold them normally vertical as well as, at times, to hold lever 257 in latching position.

Further to the purpose of releasing the tension on the fabric at the time of narrowing, the holding pawls 226 (Fig. 27) are simultaneously disabled. The arrangement whereby this result is obtained comprises a bent lever or arm 265 pivoted at 266 on one of the brackets 200 coaxially with holding pawls 226. A collar 267 on a rod 268 holds lever 265 normally in such position that, when pawls 226 are held in active position (Fig. 27) by their springs 254, a projection 269 of lever 265 (Fig. 28), on the opposite side of pivot 266 from rod 268 comes into contact with the extensions 270 of the pawls 226 on the opposite side of their pivot 266 from their active ends and between pivot 266 and springs 254. Therefore, when lever 265 is turned counterclockwise as viewed in Fig. 27, projection 269 throws the pawls 226 away from the teeth of ratchet wheel 224. To turn and hold arm 265 so as to thus disable pawls 226, the front catch-bar shaft 43 (Fig. 3) is turned by its associated narrowing cam (not shown) so that arm 262 (Fig. 3) draws rod 268 to the left from the position shown in Fig. 27 to force pawls 226 away from wheel 224. The tension in springs 211 having been already released by the pawl 217 on yoke 218, the racking pawl 223 has no effect in holding the tension on the fabric, which is therefore entirely slack.

Spring 272 for the racking pawl 223 is connected between pins 273 and 274 on arm 222 and pawl 223 respectively which are so placed that the spring 272 lies on the right of the pivot of pawl 223 when the pawl is acting on the ratchet wheel 224 as shown in Fig. 27. However, spring 272 may be swung across to lie on the left of the pivot of pawl 223 when the pawl has been thrown against arm 265, so that the pawl is held in the position shown in Fig. 26. As a convenience in moving pawl 223, pin 274 is shown in the form of a handle.

It is desired at times to throw the ratchet means on shaft 210 entirely out of action irrespective of the situation of the springs 211 at the time. For this purpose, racking pawl 223 is thrown into inoperative position as shown in Fig. 26 and the holding pawls 226 are simultaneously disabled. The arrangement whereby this result may be obtained comprises, in addition to the arrangement of the holding pawls 226 and bent lever 265, the feature that racking pawl 223 is made long and wide enough so that, when swung counterclockwise away from ratchet wheel 224, the outside of pawl 223 presses against the front face of arm 265 to disengage holding pawls 226 from the teeth of wheel 224 by means of the contact between pawls 226 and arm 265 at point 269. Owing to the fact that the spring 272 for racking pawl 223 is thereby caused to pass to the other side of the axis on which pawl 223 is mounted, the spring 272 then holds the parts in the relative positions shown in Fig. 26 until the operative throws pawl 223 back into the position shown in Fig. 27.

The fact that mechanism E can be thrown out of action when desired so far as the tension on the fabric is concerned provides cooperation between mechanism E and the auxiliary fabric tensioning means which includes shaft 135. By throwing the latch 82 to hold the shaft 135 against the pull of weight 138 and also throwing off the tension springs 211 by one of the manual or automatic means available for this purpose, the operative may turn the welts on all the knitting sections without hindrance from either the auxiliary or the main tensioning means and without danger that a total tension suitable for use when there is fabric on all the knitting sections will be used when fabric is on only a few sections.

*Modifications*

In Figs. 40 to 47, inclusive, I have shown a modified form of the invention permitting a reduction in the number of parts as compared to the apparatus hereinabove described.

As shown in Fig. 40, a pivoted lever 129A, which performs, in general, the functions of lever 129, has no crank arm or linkage associated therewith, but has affixed thereto a grooved segment 164 to one corner of which is connected, at 165, a chain 144A, the upper end of which winds about a helically grooved drum 146A fixed on shaft 135A. It will be understood that shaft 135A has a weight (not shown) connected thereto similarly to the weight 138 connected to shaft 135 in Fig. 2, so that shaft 135A tends to turn clockwise when viewed as in Fig. 40. When lever 129A is raised or swung forward and upward from the position shown in Fig. 40, the chain 144A is unwound from drum 146A and the weight raised. Shaft 135A has fixed thereon two disks or drums 167 arranged in alignment with rails 96A, one to each. Rails 96A perform the same functions as rails 96 in the first described form of apparatus. Rails 96A have, however, a different form, being provided with grooves 168 (Fig. 44) therein which extend downward from the top surfaces of the rails and have lateral extensions 169 which serve as supporting guides permitting travellers 170 (Fig. 42) to move longitudinally of rails 96A while holding these travellers above the bottoms of grooves 168, for purposes which will presently appear.

Each traveller 170 has a projection 172 extending downwardly from its bottom surface into the groove 168 and shown as the head of a screw 173. Attached to each projection 172 is one end of a spring 174, the other end of which is attached to a flange 175 secured to one end of a steel band 176 by which the travellers are moved rearwardly and forwardly in the grooves 168 of the rails 96A. As appears clearly in Fig. 43, each band 176 extends around and is fastened to one of said drums 167 by pressing the bent end 178 of the band into a slot 179 in the surface of the drum and fastening down the band on the drum by a headed pin 180 placed adjacent slot 179, pin 180 extending into a socket in drum 167 and the aperture for pin 180 in band 176 being approximately the same size as that in the drum so that this pin clamps the band under the shoulder formed by its head and holds the band against drum 167 at a point near slot 179 so that the flanged end 178 of the band will not escape from the slot in use. In addition to pin 180, I have shown for each drum 167 a set of headed pins 181 similar to pin 180 set radially into drum 167, but having their heads flush against the drum due to the fact that the band 176 has apertures for all the pins 181 as large as the heads of these pins. Pins 181, therefore, act merely as sprocket driving members for the band 176 and not as clamping members therefor. The band 176 is made long enough so as to provide for the full stroke of travellers 170. In the arrangement shown, this requires that bands 176 extend nearly twice around drums 167 when the travellers 170 are at the forward ends of their paths, as shown in Fig. 43, bands 176 having also relatively large openings to receive the heads of pins 180 as well as the heads of pins 181, when the bands overlap on themselves.

As is clear from Figs. 43 and 47, the free end of a band 176 can draw away from the front end of its traveller 170 because of the stretch in spring 174. This permits the pull of the weight to be applied to the loops of the stocking welt without jerks, but it also avoids the necessity of having chain 144A of an exact length in order that the travellers may be held at the forward ends of their paths when the lever 129A has been latched in its position by latch lever 160A. The forward limits of movement of the travellers 170 are fixed by plates 100A, which are shown as fastened to the tops of rails 96A by screws.

When lever 129A is swung upward from its down position, flanges 175 at the rear ends of bands 176 are pushed against travellers 170 so as to move the travellers toward the needles. In order that the bands 176 may transmit thrusts against the travellers in this manner, the bands are bowed transversely of their length by being required to pass through openings of less width than the width of the bands 176. One such opening is shown at 185 in Fig. 45, opening 185 being formed in the down turned end 186 of a thin plate 187 which projects forwardly from the free end of each rail 96A and is suitably fastened thereto. As shown in Figs. 43 and 45, each plate 187 is fastened to its rail 96A by screws 188. The opening 185, however, being narrower than the width of band 176, the band bows where it passes through this opening and the same degree of bow or transverse curvature is maintained in each of the bands at all points within the rails 96A, as shown in Fig. 44, because the distance between the outsides of the lateral grooves 169 opening from each main groove 168 is the same as the width of aperture 185. In order not to interfere with the proper curvature of band 176 where it connects with flange 175, the extension 189 of the latter which lies in contact with band 176 has the same transverse curvature as the band, as is also shown in Fig. 44, and parts 176 and 189 are fastened together by suitable means, rivets 191 being shown for this purpose in Fig. 43. Preferably, also a guard plate portion 192 of the plate 187 is provided for each disc or drum 167 to protect the operatives from the heads of the pins 181.

Figure 41:
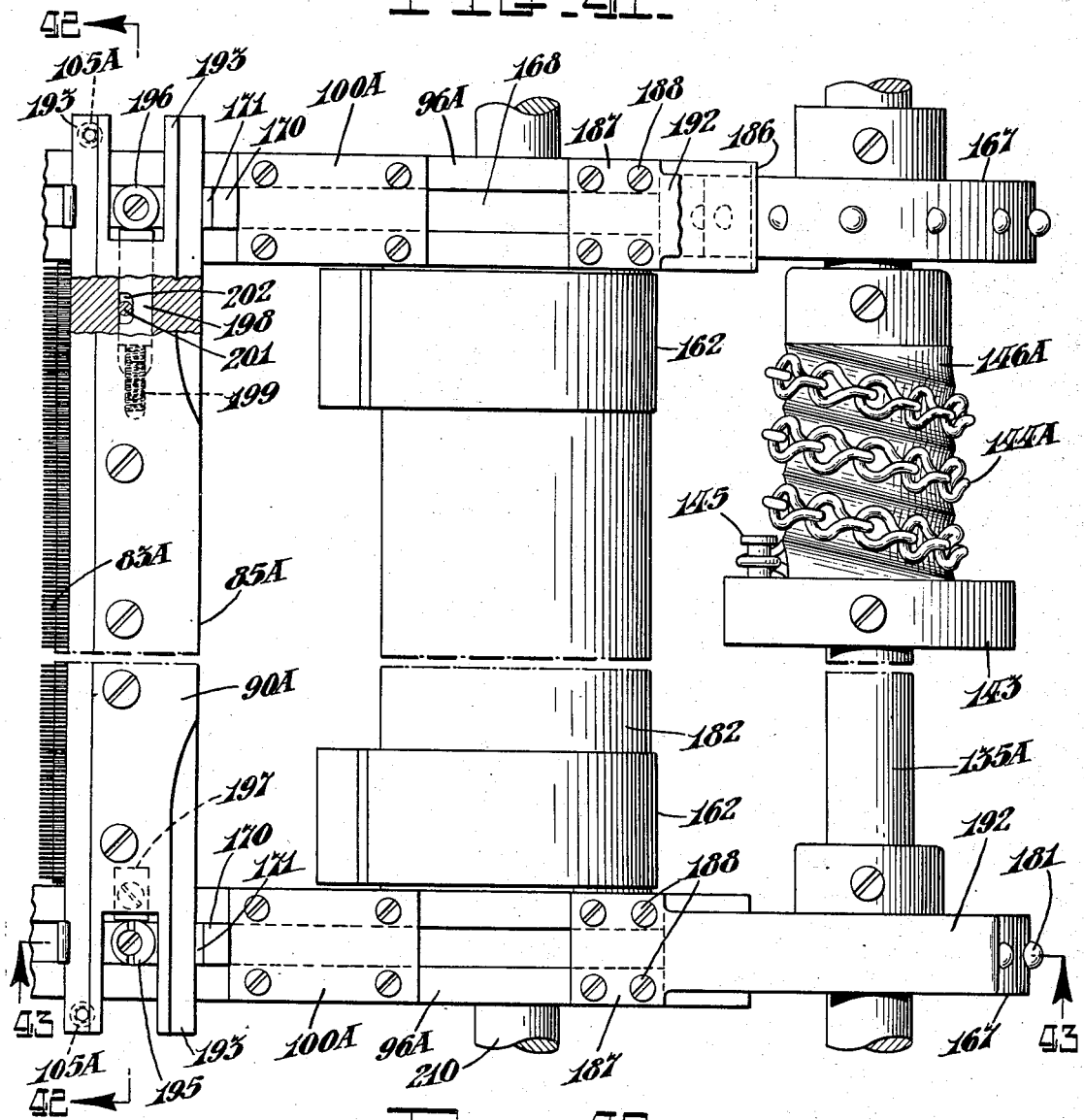
Fig. 41 is a plan view of parts shown in Fig. 40 and being enlarged relative thereto.
Figure 42:
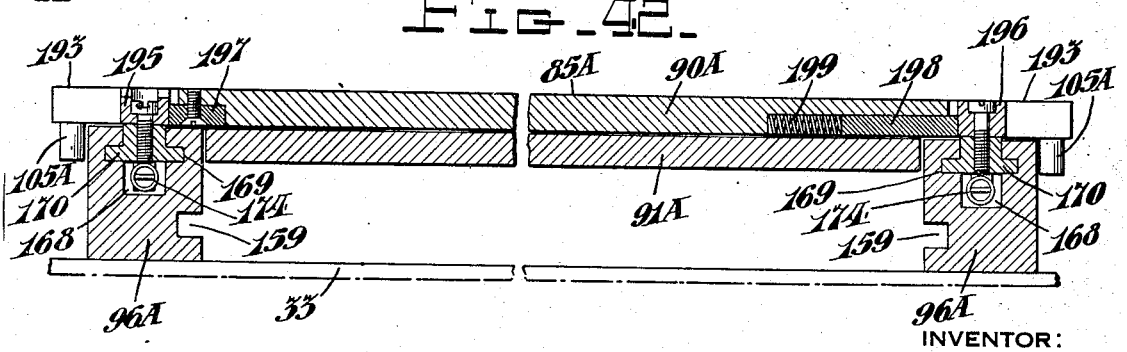
Fig. 42 is a sectional view taken substantially on the line 42—42 of Fig. 41.

As will appear from a comparison of Fig. 5 with Fig. 41, the form of the welt bars which may be used in accordance with the invention may be varied within considerable limits. The welt bar 85A shown in Figs. 41 and 42 comprises a top plate 90A and lower plate 91A, the top plate 90A being cut away to form forked end portions 193 which rest one on each of a pair of travellers 170 in rails 96A. One of each pair of travellers 170 has a spool or cylinder 195 secured to its top face in position to lie between the prongs of one of forks 193 of a welt bar 85A when the bar is in correct position on the travellers, and the other traveller of a given pair has a spool or cylinder 196 screwed to its top in position to lie between the prongs of the other fork 193 of a given welt bar. The spool 195 has its screw hole set eccentrically, however, so that by loosening its screw, the angular position of spool 195 may be changed to vary the distance between its surface and that of its companion spool 196. The position of bar 85A may thereby be adjusted for the reason that each such bar has a contact plate 197 shown as held by the screw means in a socket in the under face of one end of its top plate 90A and projecting somewhat therefrom; and the other end of said plate 90A has a slidable plate 198 socketed therein and so arranged that spring 199 at the inner end of the socket for plate 198 presses the plate outwardly against spool 196 when bar 85A is in the position shown in Fig. 42. Spring 199 is strong enough to ensure that the plate 197 on welt bar 85A is pressed against spool 195. Therefore, by loosening the screw for spool 195 and changing its angular position before screwing it down again, the position of bar 85A when in use is adjusted transversely of rails 96A to position the welt hooks 83A properly with respect to the needles, sinkers, dividers and knockover bits. A pin 201 in plate 90A extends into a cut-out 202 in plate 198 to prevent it from being thrown from its socket at undesired times as when its bar 85A is lifted from the travellers 170.

As appears in Figs. 43 and 47, each traveller 170 projects up at its front end to form a shoulder 171 against which one of the prongs of a fork 193 of a welt bar 85A rests when in use. The rear end of each traveller 170 has fastened thereto an upstanding stiff strip 205, preferably but not necessarily of metal, against which the rear edge of another of the prongs of forks 193 rests when in use. The upper portions of both shoulder 171 and strip 205 are flared away from the center line of the traveller as shown at 206 and 203, respectively, to provide surfaces adapted to guide a welt bar 85A toward its proper position on the travellers 170 to facilitate placing the welt bars 85A on the travellers. The upper end of strip 205 further is shown as jogged inwardly at 204 so as to spring inwardly above the edge of the welt bar 85A when the latter is in position for use. Strip 205, as shown, therefore also holds the bar down on the carriage or traveller as well as resists the pull of the loops on the bar when in use. Preferably one of the prongs of fork 193 at each end of a bar 85A has a spool or pin 105A (Fig. 42) spaced slightly from the outside of the adjacent rail 96A, the two pins 105A serving to assist the operative in centering a bar 85A on its sliders and to prevent the operative from placing a bar 85A on its carriages or travellers in an improper position.

In respects other than those mentioned, the form of apparatus shown in Figs. 40, 41 and 46 is identical with that shown in Figs. 1, 2, 3, 4 and 5.

In operating the form of apparatus shown in Figs. 40, 43 and 46, when crank 129A is raised, shaft 135A is turned in the direction to move travellers 170 rearwardly toward the needle banks until stopped by the contact of pins 105A on the travellers with pins 110A on the rails. If desired, crank 129A is then latched by latch 160A in raised position to hold the welt hooks 83A in bars 85A in position to catch the loops of the first course when the loops are pulled off the noses of the sinkers by the needles, although an operative can, of course, hold the crank 129A in the desired position by hand. When the loops of the first course of a piece of fabric have been placed on hooks 83A by the needles, the crank 129A is allowed to move forwardly and downwardly thereby placing the pull of the weight (the equivalent of weight 138) on the fabric. Knitting then continues and the welt rods are put in place as described in connection with the form of apparatus shown in Figs. 1 to 25, inclusive. The knitting is stopped automatically by the pattern chain (not shown) when the full length of the two ply section has been knitted. An operative then picks up each of the welt bars 85A and places the loops of the first course thereon on the needles, thereafter replacing the bar on its corresponding travellers and attaching the regular draw-off harness to the welt rod. The knitting then proceeds in the ordinary way, the carriages or travellers for the welt bars remaining in their forward positions until needed. At the beginning of the next welt, they are thrown forward again by raising the lever 129A.

Use of the form of the invention shown in Figs. 1 through 25 inclusive has developed that it is sometimes desirable to make welts of greater length than permitted by this form of apparatus. To permit the making of longer welts, I have devised the modification shown in Figs. 48 through 52. In the arrangement shown in Figs. 48 through 52, while a small number of parts are added, many of the original moving parts are modified, but the parts retain substantially the same general forms and relative positions. In Fig. 48, the crank member 124B has the hand operated lever 129 fixed thereto for operating the remaining parts. Lever 129 is mounted to turn through substantially the same angular distance in Fig. 48 as in Fig. 6, but, for reasons that will presently appear, handle 129 might drop beyond the desired point at the lower end of its stroke if allowed to hang freely and crank 124B therefore has fixed thereto a lug 305 in which is adjustably mounted a contact screw 306 adapted to strike the under face of a bearing member 307 to stop the downward stroke of crank 124B and lever 129 at the desired point. Bearing member 307 is fixed to one of the center frames 34 and carries one of the usual shafts of the machine. The cam 128B of Fig. 48 has the same general functions and formation as cam 128 and is fixed to the crank member 124B in the same way that cam 128 is fixed to crank 124. Cam 128B operates lever 148B in much the same way that cam 128 operates lever 148, and lever 148B has a side arm 152 carrying a cam follower 153 for cooperating with cam 128B when the cam is turned to swing lever 148B about its pivot 151 on bracket member 117B. Also lever 148B has its outer end connected to the chain 144 which acts on the shaft 135 in much the same way as in Fig. 6. However, when the welt bars 90 are at the extreme forward end of tracks 96B, the weight, similar to the weight 138 shown in Fig. 1 still acts on shaft 135 to keep chain 144 under tension.

When a shorter welt is to be knit with the arrangement shown in Figs. 48 to 52, the stroke of the link 109B may be correspondingly adjusted by placing a stop plate, similar to the stop plate 100 shown in Fig. 6, or some other stop member, on the tracks 96B to limit the movement of the link 109B in the direction away from the needles 75. For proper operation it is also necessary to maintain a definite relationship between the movement of the welt bar 90 and the action of the cam 128B to wind up the weight 138 for all lengths of welts produced. For this purpose, the lever 148B is provided with a lug 309 having an adjusting set screw 310 therein which is adapted to bear against the lower end of bracket member 117B. With this arrangement the follower 153 may be adjusted relative to the cam 128B for the different lengths of welt to be produced so that the action to wind up the weights 138 will not start until just prior to the movement of the welt bar 90 from its adjusted position.

Crank 124B has link 122 pivoted thereto for transmitting the motion of the end of the crank to the forward end of the lever 115B, which has a gear segment 114B on its other end for turning shaft 112B. As the motion of crank 124B is substantially the same in the form shown in Fig. 48 as the motion of crank 124 in the form shown in Fig. 6, either the segment 114B must be longer or the gear ratio between it and the gear on shaft 112B with which the segment meshes must be greater in order that shaft 112B may be turned through a greater angle to give welt bars 90 a longer traverse.

As is clear from Fig. 49, levers 101B which connect directly with the guide members 98B and travellers 102B cannot be moved to the position shown in Fig. 48 merely by swinging the links 109B to which they are pivoted by turning shaft 112B, because, in Fig. 48 the links 101B have passed beyond the dead center of their motion in the direction away from the needles 75. The travellers 102B or the welt bar 90 must therefore be pulled by hand before they can reach the position shown in Fig. 48. Similarly, links 101B and welt bars 90 cannot be moved toward needles 75 from the positions shown in Fig. 48 merely by swinging links 109B. Swinging links 101B forward to the position shown in Fig. 48 does not require mechanical means, as the operator can manually pull the travellers and links 101B forward with the same motion with which he replaces the welt bar on the tracks. To move the bars and links 101B toward the needles beyond the dead center position would, however, require additional attention and movements on the part of the operator. Therefore, means are provided whereby the shaft 112B may turn and draw links 101B toward the needles for the distance needed to cause links 101B to slant toward the needles before the links 109B are operated by the shaft 112B. To this end, links 109B are made loose on shaft 112B, each link 109B having two collars 312, Fig. 50, fixed thereto and loosely surrounding shaft 112B at points spaced along the shaft. Intermediate the collars of each link 109B, shaft 112B has a cam piece 313 fixed thereon. Piece 313 has two projections or dogs 314 and 315 thereon, lying on opposite sides of a portion 316 of a link 109B which bridges between the two collars thereof. Projection 314 is adapted to contact portion 316 to turn the link 109B in the counterclockwise direction as viewed in Figs. 48 and 51 while projection 315 is adapted to turn link 109B in the clockwise direction. Adjacent the plane of each track member 96B, shaft 112B has a cam piece 318 fixed thereto for swinging one of the links 101B toward the needles at the beginning of a cycle. Each of pieces 318 is cut flat at one section 319 of its perimeter and has a projection 321 extending somewhat tangentially but having a flat face 322 forming with said flat 319 a right angled notch adapted to receive a hook portion 323 of a connecting member 324, portion 323 having a flat 320 lying parallel to and adjacent flat 322 when the parts are positioned as shown in Fig. 48, so that cam projection 321 will force member 324 to the left when shaft 112B is turned counterclockwise, as viewed in Fig. 48. To permit motion of member 324 in response to the thrust of cam projection 321, member 324 is conveniently mounted on a bolt 325 which extends through horizontal slot 326 in member 324 and into the side of a track member 96B, the head of bolt 325 being spaced from the side of the track member 96B so as to allow member 324 to slide on the bolt, see Fig. 50. At the right hand end of slot 326, member 324 bends downwardly and then extends to the right, its right hand end as viewed in Figs. 48 and 52 being formed into a second hook 327 having a flat vertical face 328 adapted to engage a short pin 329 fixed to and projecting from one face of link 101B. The horizontal distance between the flat faces 320 and 328 is such that they may engage projection 321 and pin 329 simultaneously and thereby transmit the thrust of cam projection 321 to pin 329 and lever 101B. Therefore, as shaft 112B is turned counterclockwise from the position shown in Fig. 48, the first effect is to swing levers 101B toward the needles by the action of member 324. After levers 101B have been swung far enough to incline toward the needles, projection 314 engages portions 316. After projections 314 engage portions 316 of links 109B, the further movement of links 101B and welt bars 90 toward the needles thereupon is caused by the action of links 109B on links 101B as in the apparatus shown in Figs. 1–25. At about the time projections 314 contact portion 316 of links 109B, the cam projections 321 pass out of contact with hooks 323 and members 324 are thereupon drawn back to their orginal positions by springs 331 the one ends of which are attached to pins 332 extending laterally from the members 324 and the other ends of which are attached to pins 333 projecting from the bottoms of track members 96B (Fig. 49). Pins 332 being below the bolts 325, springs 331 tend to turn members 324 counterclockwise about bolts 325 so as to hold members 324 normally in position such that their portions 323 will engage cam projections 321. However, springs 331 yield readily to permit cam projections 321 to pass the lower edges of hooks 323 when the shaft 112B is turned clockwise to restore it to the position shown in Fig. 48. On the other hand, the left hand ends of members 324, as the members are viewed in Fig. 48, are flattened as shown at 334 and rest on the top of the front bed or table 33 so as to be held always close above the shaft 112B to engage cam portion 321, but so that the member 324 may not interfere with the table when the member 324 is thrust toward the needles. Movement of members 324 by springs 331 is limited by bolts 325 so that members 324 may not be drawn off table 33.

From the foregoing, it will be seen that it is desirable that cam 128B be so formed that it shall not turn lever 148B until dogs or projections 314 on shaft 112B have begun to move levers 109B, but must thereafter move lever 148B through practically the same arc as cam 128 moves lever 148 in Fig. 6. Cam 128B is therefore of different contour from cam 128.

Unless otherwise indicated, corresponding parts of all illustrative forms of the invention are identified by similar reference characters.

Of course, the improvements specifically shown and described by which I obtain the above results, can be changed and modified in various ways without departing from the invention herein disclosed and hereinafter claimed.

I claim as my invention:

1. A hook-up mechanism for flat knitting machines comprising in combination a set of hooks adapted to engage the initial length of yarn laid to the needles, means to apply pressure to said hooks to move them rearwardly toward the needle row into position to engage said initial length of yarn, means to latch said hooks in said rearward position, and means to urge said hooks forwardly away from the needle row and adapted to act immediately upon release of said latch.

2. A hook-up mechanism for flat knitting machines comprising, in combination, a bar having horizontal hooks thereon, means for exerting pressure on said bar sufficient, when unopposed, to draw said bar forwardly away from the needle row, means whereby said pressure may be overcome to move said hooks into position to engage the initial length of yarn laid to the needles, and means to latch said second means, said pressure exerting means being adapted to apply said forward pressure to said bar immediately upon release of said latch means.

3. In a hook-up mechanism for flat knitting machines having needle rows and sinkers, in combination, a bar having horizontal hooks therein adapted to engage the yarn of the initial course laid to the needles, guide means for said bar on which it can be moved rearwardly toward the needle row or forwardly away from the needle row, means for urging said bar in the direction away from said needle row, means whereby said bar may be pushed toward the needle row against the urging of said last means but which then offers no resistance to the movement of said bar on said guide means away from the needle row, one of said pushing means and said bar having parts interfitting with the other one to center the bar so that said hooks will receive the loops of the initial course from the sinkers but arranged to permit the bar to be readily fitted to the pushing means and to permit a ready separation of the two.

4. A hook-up mechanism for multi-section flat knitting machines comprising in combination a bar having a set of hooks adapted to engage the initial length of yarn laid to the needles, travellers arranged to move toward and away from the needles and so apply pressure to said bar to move the hooks thereon rearwardly toward the needle row into position to engage said initial length of yarn, means to move said travellers rearwardly to apply said pressure and to move said travellers forwardly to relieve said pressure, and means to urge said bar forwardly away from the needle row immediately upon release of said rearward pressure, said last means including means whereby it can be thrown out of action to permit turning the welts on all the sections while entirely relaxed.

5. In a straight knitting machine, a hook-up mechanism including a welt bar, travellers arranged to move said welt bar toward and from the needle row, means for applying a forward tension to said welt bar and means for increasing the potential energy of said tension means when said travellers move in the direction toward the needle row, said travellers having means permitting ready removal of said bar therefrom for welt turning purposes.

6. In a straight knitting machine, a hook-up mechanism having travellers arranged to move toward and from the needle row and to move a welt bar therewith, and metal ribbons arranged to draw said travellers away from the needle row and to push them toward it.

7. In a straight knitting machine, a hook-up mechanism as set forth in claim 6 together with a resilient connection between the metal ribbons and the travellers.

8. In a straight knitting machine, a hook-up mechanism as set forth in claim 6 and in which the metal ribbons are curved transversely of their length.

9. In a straight knitting machine, a welt bar, a hook-up mechanism comprising slidable travelers arranged to move toward and from the needle row and to move said welt bar back and forth therewith, said travellers and welt bar having disengageable complemental projections and sockets to position the bar accurately in the direction parallel to the needle bar.

10. In a straight knitting machine, a welt bar, a hook-up mechanism comprising slidable travellers arranged to move toward and from the needle row and to move said welt bar toward and from the needle row therewith, said travellers and welt bar having disengageable complemental projections and sockets to position the bar accurately in a direction parallel to the needle row and also at proper spacing from the needle row.

11. In a flat knitting machine, a welt bar, a hook-up mechanism comprising travellers arranged to move toward and from the needle row and to simultaneously move the welt bar therewith, and means for adjusting the fixed position of said bar on said travellers comprising spools at least one of which is held on an eccentrically placed pin.

12. In a straight knitting machine, a hook bar, a hook-up mechanism having travellers arranged to move toward and from the needle row and to move said hook bar in both directions therewith, and means for accurately positioning said bar in a direction parallel to the needle row comprising abutments fixed when in use but at least one of which may be adjusted to vary the position of its abutting surface in the direction parallel to the needle row, and resilient means on the bar thrusting it longitudinally of the needle row.

13. In a straight knitting machine, a welt bar, a hook-up mechanism including travellers arranged to move toward and away from the needle row and to move said welt bar toward the needle row therewith, means for applying a forward tension to said welt bar independent of said mechanism, a lever, means operated by said lever to move the travellers and simultaneously increase the potential energy of said tensioning means, and a stop-plate against which said travellers may rest in their extreme forward position.

14. In a hook-up means for straight knitting machines, a needle row, traveller members arranged to move on parallel lines toward and from said row, means on said members for connecting a welt bar thereto when the bar is connected to the edge of fabric on said row, said means being readily disengageable therefrom to permit the bar to be readily lifted from engagement with said means for the purpose of placing the loops of the first course on the needle row.

15. In a hook-up mechanism for flat knitting machines, a welt bar, a hook-up means comprising travellers arranged to move toward and from the needle row and to move said welt bar toward the needles therewith, said travellers and welt bar having cooperating projections and recesses to position the bar accurately in the direction parallel to the needle bar.

16. A hook-up mechanism for flat multi-section knitting machines comprising in combination means to move welt bars having welt hooks toward the needle rows into position to cause said hooks to engage the yarn of the first course of a given fabric, an auxiliary draw-off means adapted to be connected to said bars to place tension on the fabric and including a shaft and means for applying a turning moment thereto, and a latch adapted when so desired to hold said shaft against said turning moment to relieve the fabric from tension.

17. In a knitting machine having a needle row and sinkers and dividers for kinking yarn around the needles, a hook-up means comprising a welt bar having hooks thereon adapted to engage the yarn of the first course of a fabric on said needle row, and means to move said bar to a position between said needles in which the hooks may engage said first course, said moving means and said bar having engaging parts adapted to center the bar so that said hooks will lie substantially in the planes of said sinkers and dividers when between the needles and said parts arranged to facilitate removing said bar from engagement with said moving means and replacing it in engagement therewith.

18. A hook-up mechanism for flat knitting machines comprising in combination a welt bar having a set of welt hooks adapted to engage the initial length of yarn laid to the needles, a main means to apply pressure to said hooks to move them rearwardly toward the needle row into position to engage said length, and an auxiliary means including a portion only of said main means for giving said bar an initial movement toward the needle row.

19. A hook-up mechanism for flat knitting machines comprising in combination a pair of travellers mounted to reciprocate on track members for pushing a welt hook bar toward the knitting needles, a lever connected to each of said travellers for moving it along its track member, a rotatable shaft, a lever pivoted at one end to said lever and so mounted on said shaft at its other end as to be turned by the shaft to transmit a thrust from the shaft to a traveller, and a detachable connection between said shaft and said first lever arranged to swing said first lever toward the knitting needles to start the movement of the welt hook bar, the connection between said second lever and said shaft being arranged to permit the shaft to make an initial angular movement without turning the second lever.

20. A hook-up mechanism for flat knitting machines comprising the combination as set forth in claim 19 and in which the detachable connection includes a member mounted to slide on a fixed support.

21. A hook-up mechanism for flat knitting machines comprising the combination as set forth in claim 19 and in which the detachable connection includes a support, and a slidable member on said support having hook shaped portions on opposite sides of the support.

22. A hook-up mechanism for flat knitting machines comprising the combination as set forth in claim 19 and in which the detachable connection includes a slidably mounted member having a hook shaped portion relatively near each of its ends, a dog on the shaft for engaging one of said hook portions to throw the member toward the knitting needles, and means whereby the other hook on the member engages the lever directly connected to the traveller.

23. A hook-up mechanism for flat knitting machines comprising the combination as set forth in claim 19 and in which the detachable connection includes a slidably mounted part, having a hook shaped portion relatively near each of its ends, a supporting means for said slidably mounted part adapted to hold the part so that one end of the part extends above the shaft, together with a cam on the shaft for engaging said end, and a spring arranged both to draw said part in the direction opposite to that in which it is moved by said cam and to urge said end toward the shaft.

24. A hook-up means for flat knitting machines comprising a main means for advancing a group of welt bars to engage the initial courses of loops and adapted to permit the production of welts up to a certain length, and an auxiliary means adapted to cooperate with said main means in advancing the welt bars and supplementing said main means so as to permit the production of welts of a length greater than said certain length.

25. A hook-up mechanism for flat knitting machines comprising means for advancing a welt bar to engage the initial course of loops, a draw-off means for fabric held on said bar including a take-off reel and means to turn said reel, a readily disconnectible means for connecting said bar to said reel, and means for holding said reel against said turning means when said connecting means is disconnected to permit turning a welt.

26. In a hook-up mechanism for flat knitting machines having a needle row and sinkers, in combination, a welt bar having hooks therein adapted to engage the yarn of the initial course laid to the needles, substantially horizontal rails on which said bar is adapted to move toward and away from the needle row, travellers mounted to move along said rails and to push said bar toward the row therewith, means for urging said bar away from the needle row, and means for moving said travellers along said rails toward the needle row against the urging of said last means, said travellers and bar arranged to interengage to accurately position said bar longitudinally of the needle row, and to permit the bar to be readily removed from said travellers for turning the welt.

27. In a straight knitting machine, a welt bar, a hook-up mechanism including travellers arranged to move toward and away from the needle row and to move said welt bar toward the needle row therewith, means for applying a forward tension to said welt bar independent of said mechanism, a lever, means operated by said lever to move the travellers and simultaneously increase the potential energy of said tensioning means, and a stationary element arranged to sustain the pull of said tensioning means when said travellers are in their extreme forward position.

28. In a knitting machine, the combination of a means for knitting a welt including a needle row, a fabric draw-off for operating on the welt, a welt bar, disconnectible means for transmitting tension from said draw-off to said bar, means to slide said bar toward said row for hooking up including a rotatable lever, and a flexible connection between said lever and said draw-off means adapted to cause the draw-off means to relax said tension transmitting means as said welt bar is moved toward the needle row.

29. In a knitting machine, the combination of means for knitting a welt including a needle row, a welt bar, rails on which said bar is mounted to slide toward and away from said row, means to positively move said bar toward said row for hooking up including a rotatable lever, a rotatable draw-off drum, flexible means for transmitting a draw-off tension from said drum to said bar, and a flexible connection between said drum and said lever arranged to turn the drum oppositely from the way it turns in applying draw-off tension whenever the bar is moved toward the needle row.

GOTTLOB BITZER.